US011231630B2

(12) United States Patent
Park et al.

(10) Patent No.: US 11,231,630 B2
(45) Date of Patent: Jan. 25, 2022

(54) DISPLAY DEVICE

(71) Applicant: Samsung Display Co., Ltd., Yongin-si (KR)

(72) Inventors: Dong Jin Park, Hwaseong-si (KR); Sung Hyun Kim, Hwaseong-si (KR); Nag Joon Kim, Asan-si (KR); Chung Hyuk Shin, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/795,386

(22) Filed: Feb. 19, 2020

(65) Prior Publication Data
US 2020/0292895 A1   Sep. 17, 2020

(30) Foreign Application Priority Data
Mar. 12, 2019   (KR) .................. 10-2019-0027840

(51) Int. Cl.
*G02F 1/1362*   (2006.01)
*G02F 1/1339*   (2006.01)

(52) U.S. Cl.
CPC ...... *G02F 1/136286* (2013.01); *G02F 1/1339* (2013.01); *G02F 1/136209* (2013.01)

(58) Field of Classification Search
None
See application file for complete search history.

(56) References Cited

U.S. PATENT DOCUMENTS

| | | | | |
|---|---|---|---|---|
| 5,032,006 A | * | 7/1991 | Grupp | G02F 1/1345 349/195 |
| 10,529,746 B2 | | 1/2020 | Bae et al. | |
| 2004/0061920 A1 | * | 4/2004 | Tonar | B32B 17/10036 359/265 |
| 2006/0132696 A1 | * | 6/2006 | Chen | G02F 1/1339 349/153 |
| 2013/0250227 A1 | * | 9/2013 | Kira | G02F 1/1339 349/153 |
| 2014/0085585 A1 | * | 3/2014 | Sung | G02F 1/13458 349/143 |
| 2015/0029432 A1 | * | 1/2015 | Ishikawa | G02F 1/13394 349/43 |
| 2016/0004110 A1 | * | 1/2016 | Imai | G02F 1/1339 349/42 |
| 2016/0377905 A1 | * | 12/2016 | Choi | G02F 1/1339 257/72 |
| 2017/0082900 A1 | * | 3/2017 | Kong | G02F 1/13452 |
| 2017/0358602 A1 | * | 12/2017 | Bae | H01L 24/08 |

(Continued)

FOREIGN PATENT DOCUMENTS

| | | |
|---|---|---|
| JP | 1998-268791 | 10/1998 |
| KR | 10-0532866 | 12/2005 |

(Continued)

*Primary Examiner* — Shan Liu
(74) *Attorney, Agent, or Firm* — H.C. Park & Associates, PLC

(57) ABSTRACT

A display device including a first substrate; a second substrate facing the first substrate; a connection pad disposed on the first substrate; a first spacer disposed on the connection pad and exposing part of the connection pad; and a connecting pad disposed on side surfaces of the first and second substrates, the connecting pad contacting the connection pad.

17 Claims, 19 Drawing Sheets

(56) References Cited

U.S. PATENT DOCUMENTS

2018/0088405 A1\* 3/2018 Nagasawa ......... G02F 1/133512
2020/0004093 A1   1/2020 Yoo et al.

FOREIGN PATENT DOCUMENTS

| KR | 10-2017-0080937 | 7/2017 |
| KR | 10-2017-0139211 | 12/2017 |
| KR | 10-2020-0003325 | 1/2020 |

\* cited by examiner

DISPLAY DEVICE

CROSS-REFERENCE TO RELATED APPLICATION

This application claims priority from and the benefit of Korean Patent Application No. 10-2019-0027840, filed on Mar. 12, 2019, which is hereby incorporated by reference for all purposes as if fully set forth herein.

BACKGROUND

Field

Exemplary embodiments of the invention relate generally to a display device.

Discussion of the Background

The importance of display devices has increased greatly with the development of multimedia. Accordingly, various display devices, such as a liquid crystal display (LCD) device, an organic light-emitting diode (OLED) display device, and the like have been developed.

In these various display devices, there exists an area in which drive integrated circuits (ICs) or printed circuit boards are installed on the outer side of a glass substrate of a display device, and this area is a non-display area in which no images are displayed and may be referred to as a bezel. In the case of a tile-type display device obtained by arranging multiple display devices in a lattice form to realize a large screen, the multiple display devices are connected to one another. Thus, the bezels of the multiple display devices appear in duplicate in areas where the multiple display devices are connected to one another, and as a result, a user's immersion in images displayed by the tile-type display device may be interfered with.

The above information disclosed in this Background section is only for enhancement of understanding of the background of the invention and, therefore, it may contain information that does not constitute prior art.

SUMMARY

Exemplary embodiments of the present invention provide a display device capable of reducing the bezel size thereof and preventing contact defects between flexible circuit boards and connection pads.

Additional features of the inventive concepts will be set forth in the description which follows, and in part will be apparent from the description, or may be learned by practice of the inventive concepts.

An embodiment of a display device includes a first substrate; a second substrate facing the first substrate; a connection pad disposed on the first substrate; a first spacer disposed on the connection pad and exposing part of the connection pad; and a connecting pad disposed on side surfaces of the first and second substrates, the connecting pad contacting the connection pad.

An embodiment of a display device includes a first substrate; a second substrate facing the first substrate; a spacer disposed along edge areas of the first and second substrates; and a recess part disposed between a side surface of the first substrate and a side surface of the second substrate. The side surface of the first substrate and the side surface of the second substrate are aligned with each other in a first direction which is perpendicular to a top surface of the first substrate and a top surface of the second substrate, and the first spacer is spaced apart from the first substrate and the second substrate by a first distance in a direction toward inner sides of the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1:
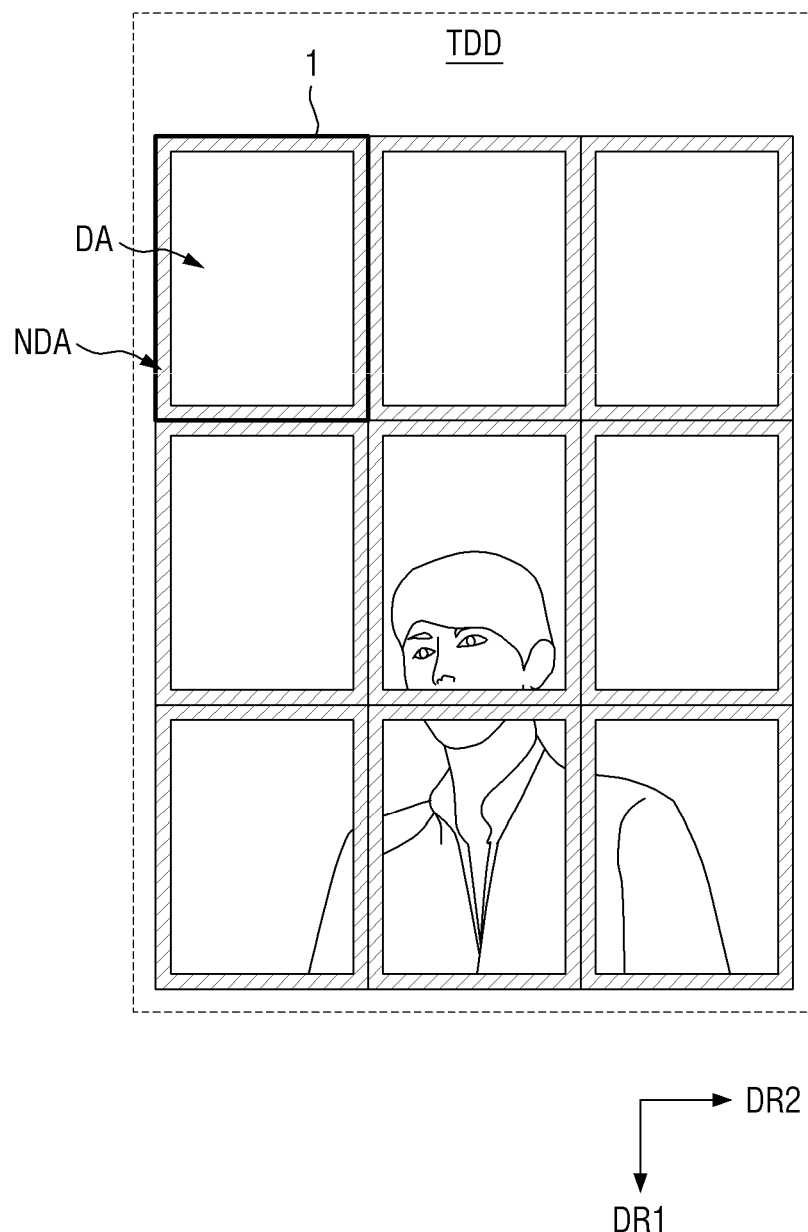
FIG. 1 is a schematic view of a tile-type display device.

In the following description, for the purposes of explanation, numerous specific details are set forth in order to provide a thorough understanding of various example embodiments of the invention. As used herein "embodiments" are non-limiting examples of devices or methods employing one or more of the inventive concepts disclosed herein. It is apparent, however, that various example embodiments may be practiced without these specific details or with one or more equivalent arrangements. In other instances, well-known structures and devices are shown in block diagram form in order to avoid unnecessarily obscuring various example embodiments. Further, various example embodiments may be different, but do not have to be exclusive. For example, specific shapes, configurations, and characteristics of an example embodiment may be used or implemented in another example embodiment without departing from the inventive concepts.

Unless otherwise specified, the illustrated example embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an example embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various example embodiments are described herein with reference to sectional and/or exploded illustrations that are schematic illustrations of idealized example embodiments and/or intermediate structures. As such, variations from the shapes of the illustrations as a result, for example, of manufacturing techniques and/or tolerances, are to be expected. Thus, example embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
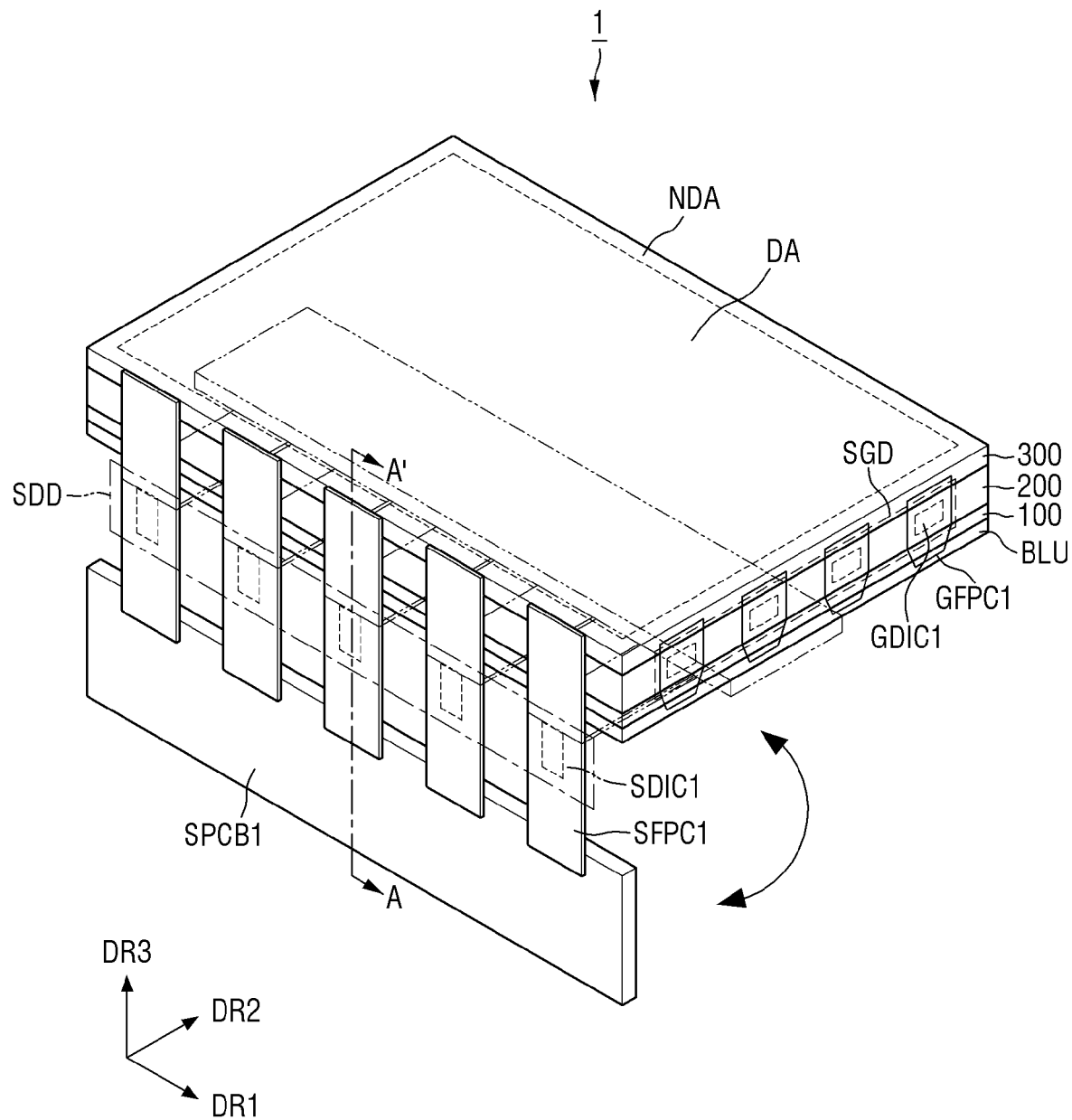
FIG. 2 is a perspective view of a display device according to an example embodiment of the present invention.
Figure 3:
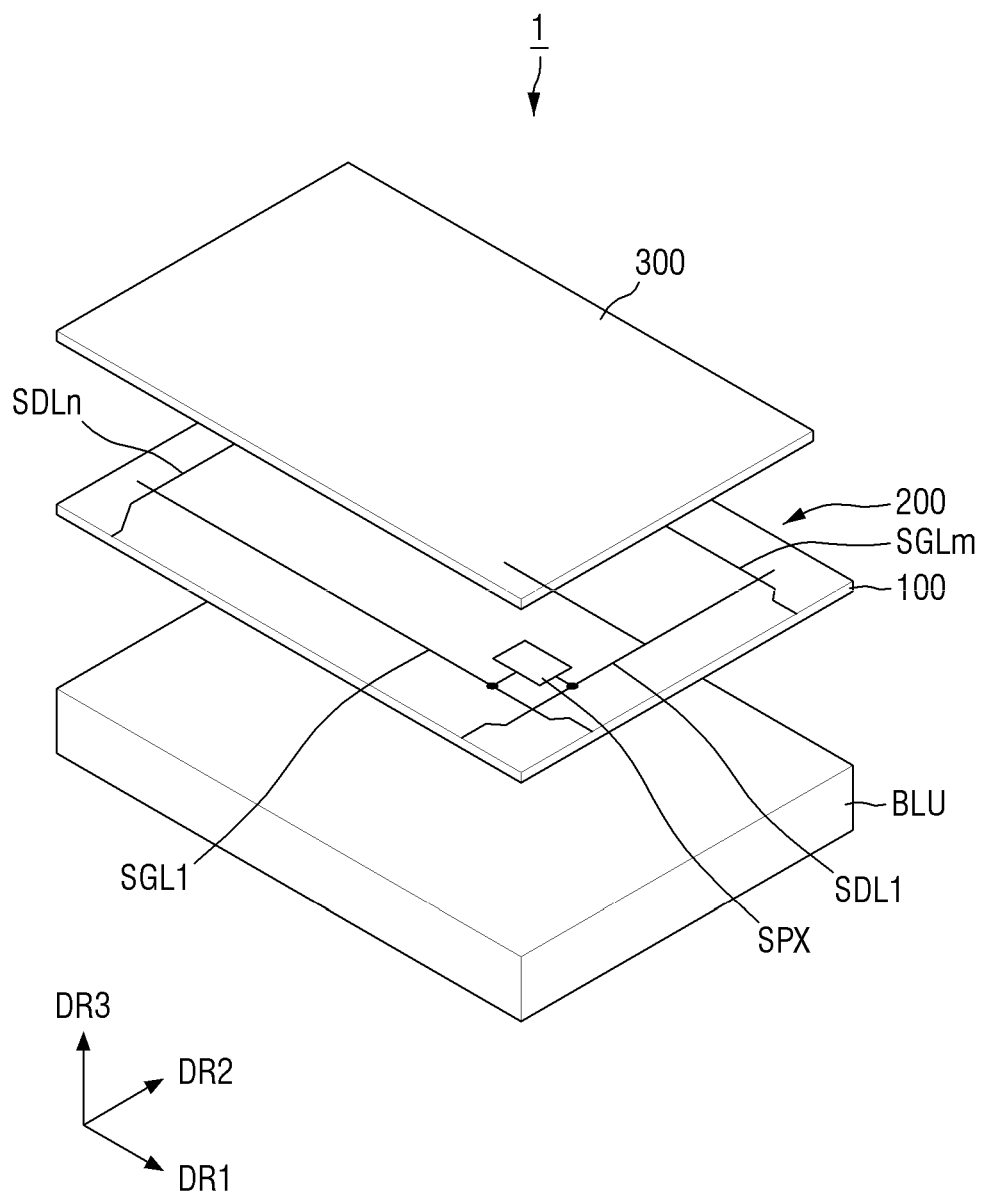
FIG. 3 is an exploded perspective view illustrating a part of the display device of FIG. 1.
Figure 4:
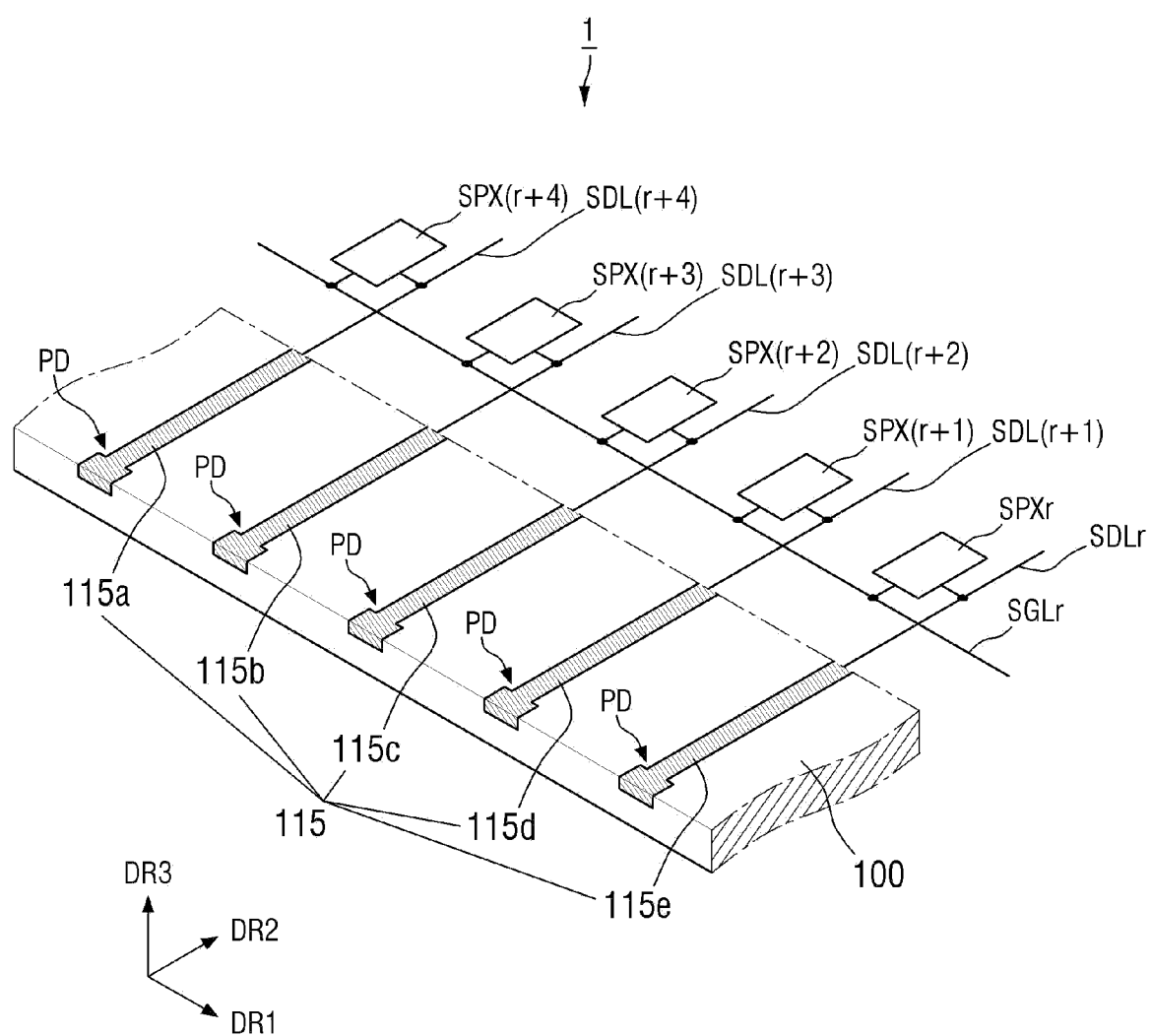
FIG. 4 is a schematic view illustrating a part of the display device of FIG. 2 for explaining a recess part.
Figure 5:
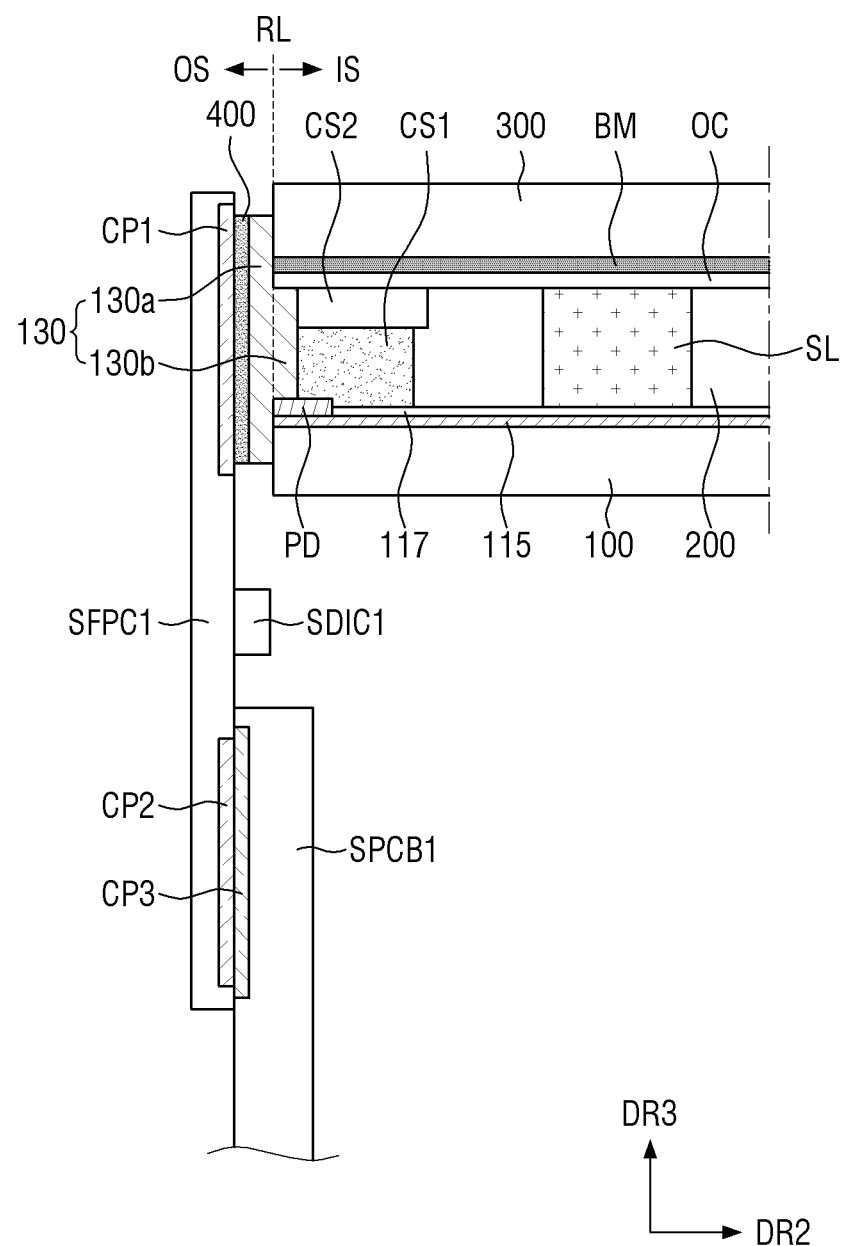
FIG. 5 is a cross-sectional view, taken along line A-A' of FIG. 2, of the display device of FIG. 2.
Figure 6:
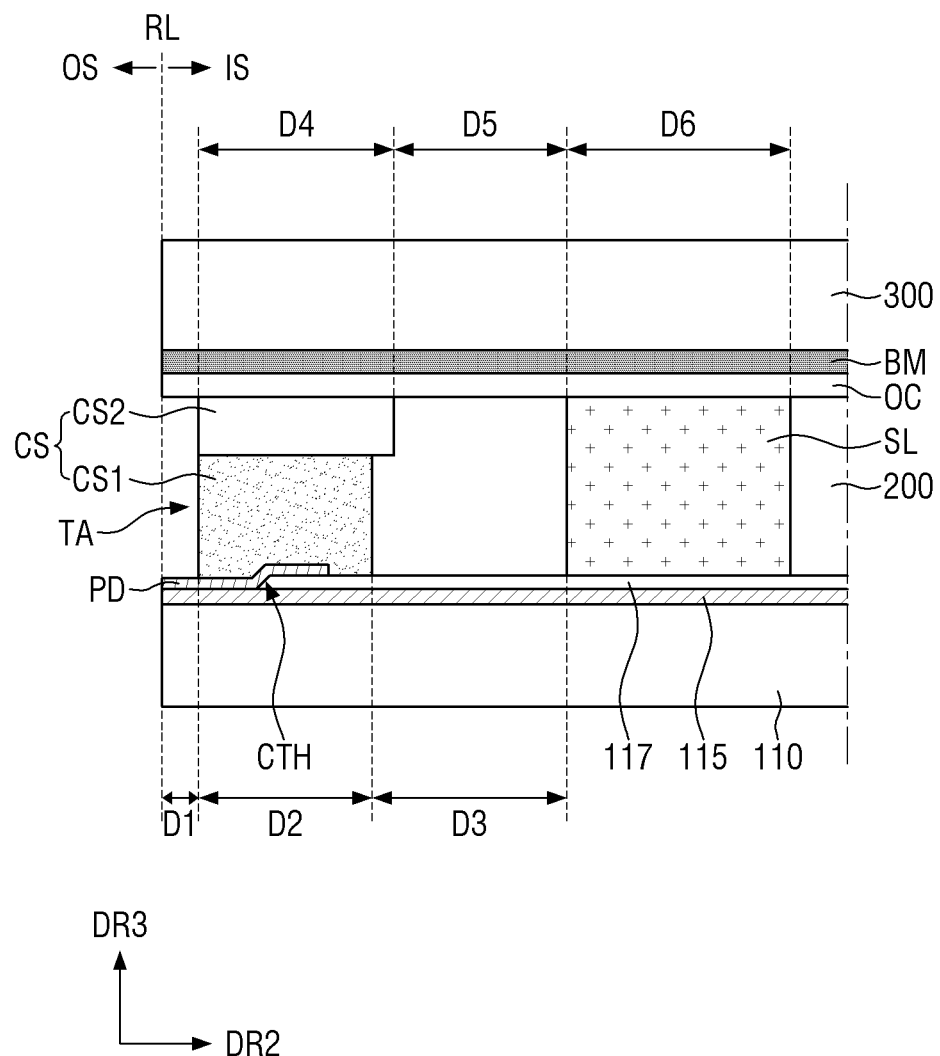
FIG. 6 is a cross-sectional view for explaining each connection pad of the display device of FIG. 2.
Figure 7:
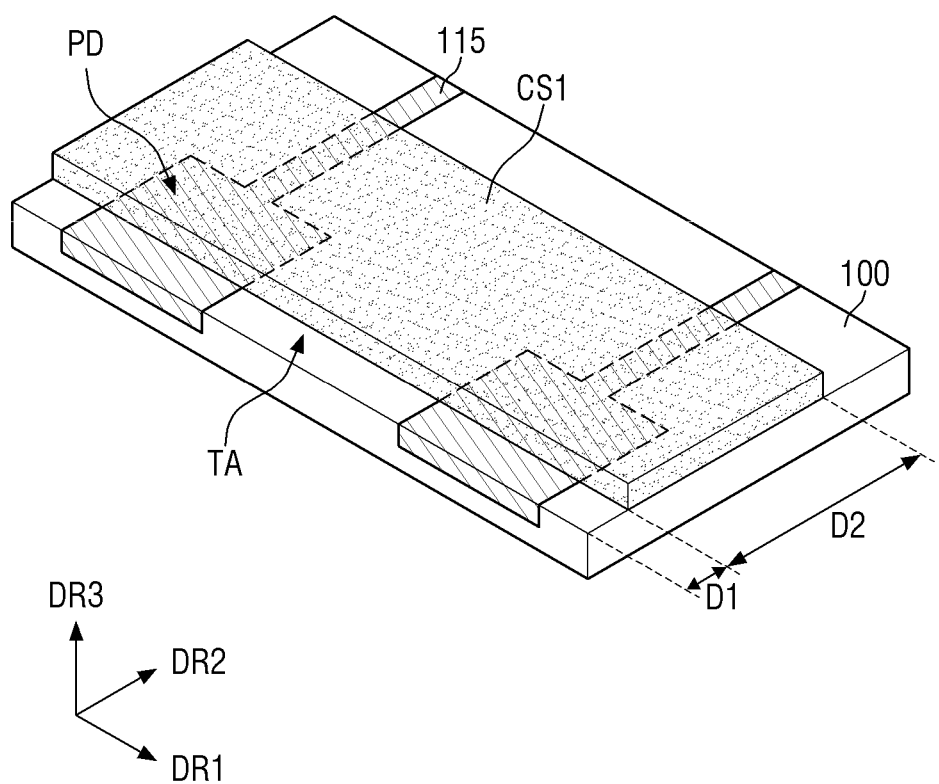
FIG. 7 is a perspective view illustrating how in the display device of FIG. 2, each connection pad disposed on a first substrate is arranged with respect to a first spacer.

FIG. 1 is a schematic view of a tile-type display device; FIG. 2 is a perspective view of a display device according to an example embodiment of the present invention; FIG. 3 is an exploded perspective view illustrating a part of the display device of FIG. 1; FIG. 4 is a schematic view illustrating a part of the display device of FIG. 2 for explaining a recess part; FIG. 5 is a cross-sectional view, taken along line A-A' of FIG. 2, of the display device of FIG. 2; FIG. 6 is a cross-sectional view for explaining each connection pad of the display device of FIG. 2; and FIG. 7 is a perspective view illustrating how in the display device of FIG. 2, each connection pad disposed on a first substrate is arranged with respect to a first spacer.

The terms "upper", "top", and "top surface", as used herein, refer to a side of the display device of a display device 1 or a side, in a third direction DR3, of the display device 1, the terms "lower", "bottom", and "bottom surface", as used herein, refer to a side opposite to the display surface of the display device 1 or a side, in the opposite direction of the third direction DR3, of the display device 1. Also, the terms "above" (or "on"), "below", "left", and "right", as used herein, refer to their respective directions as viewed from above the display surface of the display device 1. For example, the term "left" refers to the opposite direction of a second direction DR2, the term "right" refers to the second direction DR2, the term "above" refers to the opposite direction of a first direction DR1, and the term "below" refers to the first direction DR1.

The display device 1 may be a self-luminous display device, such as an organic light-emitting diode (OLED) display device, a quantum-dot light-emitting diode (QLED) display device, a micro-light-emitting diode (mLED) display device, or a nano-light-emitting diode (nLED) display device. Alternatively, the display device 1 may be a non-self-luminous display device such as an electrophoretic display device or an electrowetting display device. For convenience, the display device 1 will hereinafter be described as being, for example, a liquid crystal display (LCD) device including a liquid crystal layer.

In some embodiments, the display device 1 may be applied not only to a large-size electronic device, such as a television (TV) or an outdoor billboard, but also to a mid- or small-size electronic device such as a personal computer (PC), a notebook computer, a car navigation unit, or a camera. Also, the display device 1 may be applied to a tablet PC, a personal digital assistant (PDA), a portable multimedia player (PM), a gaming console, or a wristwatch-type electronic device. Obviously, the display device 1 may also be applied to various electronic devices other than those set forth herein.

Referring to FIG. 1, a tile-type display device TDD may include a plurality of display devices 1. For example, the plurality of display devices 1 may be arranged in a lattice form, but the inventive concepts are not limited thereto. Alternatively, the plurality of display devices 1 may be connected in the first direction DR1 or in the second direction DR2, or may be connected to form a particular shape. The plurality of display devices 1 may have the same size, but the inventive concepts are not limited thereto. Still alternatively, the plurality of display devices 1 may have different sizes.

For example, the tile-type display device TDD may have a rectangular shape including the long sides and the short sides of each of the plurality of display devices 1, and the plurality of display devices 1 may be arranged in such a manner that the long sides and the short sides of each of the plurality of display devices 1 are connected. Some of the plurality of display devices 1 may form one side of the tile-type display device TDD, some of the plurality of display devices 1 may be disposed at the corners of the tile-type display device TDD to form pairs of adjacent sides of the tile-type display device TDD, and some of the plurality of display devices 1 may be disposed on the inner side of the tile-type display device TDD to be surrounded by other display devices 1.

Each of the plurality of display devices 1 may include a display area DA and a non-display area NDA. The display area DA is an area in which images are displayed, and the non-display area NDA may be an area which accounts for the bezel of each of the plurality of display devices 1 and in which no images are displayed, and may be disposed on the periphery of the display area NDA. However, the inventive concepts are not limited to this. The shape of the non-display area NDA may differ from one display device to another display device 1 or may be uniform for all the plurality of display devices 1.

The tile-type display device TDD may have a flat shape as a whole, but the present disclosure is not limited thereto. Alternatively, the tile-type display device TDD may have a three-dimensional (3D) shape to provide a 3D effect. For example, the tile-type display device 1 may have a curved shape, or the plurality of display devices 1 may generally have a flat shape, but may be connected to one another at a predetermined angle in such a manner that the tile-type display device TDD can have a 3D shape.

The plurality of display devices 1 may be connected in such a manner that the bezels of the plurality of display devices 1, which are defined as non-display areas NDA, can adjoin one another. The plurality of display devices 1 may be connected by connecting members (not illustrated). Since the plurality of display devices 1 are connected to form the tile-type display device 1, each of the plurality of display devices 1 is required to have a thin bezel. To this end, connection pads on flexible circuit boards may be connected to a side of each of the plurality of display devices 1, and this will be described later.

Examples of a display device 1 that can be employed in the tile-type display device TDD as a unit display device, or can be used alone, will hereinafter be described.

Referring to FIGS. 2 through 7, a display device 1 may include a first substrate 100, a liquid crystal layer 200, and a second substrate 300. For example, the display device 1 may further include flexible circuit boards (SFPC1 and GFPC1), a source driver circuit board SPCB1, and a backlight unit BLU.

Each of the first substrate 100, the second substrate 300, and the backlight unit BLU may have a rectangular shape having long sides extending in the first direction DR1 and short sides extending in the second direction DR2, but the inventive concepts are not limited thereto. In some embodiments, each of the first substrate 100, the second substrate 300, and the backlight unit BLU may have curved parts in some areas thereof.

The backlight unit BLU may generate light and may provide the generated light to the first substrate 100, the liquid crystal layer 200, and the second substrate 300. A display panel including the first substrate 100, the liquid crystal layer 200, and the second substrate 300 may generate an image using the light provided by the backlight unit BLU and may provide the generated image. However, the inventive concepts are not limited to this. Alternatively, the display device 1 may be implemented as an OLED display device, in which case, an organic electroluminescent (EL) layer and/or a thin-film encapsulation layer (TFEL) may be disposed between the first and second substrates 100 and 300. For example, the organic EL layer may include pixels and a pixel-defining film which define the pixels, and each of the pixels may include a first electrode, an emission layer, and a second electrode. The emission layer may be an organic emission layer including an organic material, in which case, the emission layer may include a hole transport layer, an organic light-emitting layer, and an electron transport layer. In response to a predetermined voltage being applied to the first electrode via a thin-film transistor (TFT) and a cathode voltage being applied to the second electrode, holes and electrons move from the hole transport layer and the electron transport layer, respectively, to the organic light-emitting layer and may combine together in the organic light-emitting layer to emit light.

The TFEL prevents oxygen or moisture from infiltrating into the organic EL layer. To this end, the TFEL may include at least one inorganic film. The inorganic film may be a silicon nitride layer, a silicon oxynitride layer, a silicon oxide layer, a titanium oxide layer, or an aluminum oxide layer, but the inventive concepts are not limited thereto. The TFEL may protect the organic EL layer against foreign materials such as dust. To this end, the TFEL may include at least one organic film. The organic film may be an acrylic resin, an epoxy resin, a phenolic resin, a polyamide resin, or a polyimide resin, but the inventive concepts are not limited thereto.

In a case where the organic EL layer and/or the TFEL is disposed between the first and second substrates 100 and 300, the backlight unit BLU may not be provided.

The display panel may include a display area DA in which images are displayed and a non-display area NDA in which no images are displayed. The display area DA and the non-display area NDA of the display panel may correspond to a display area DA and a non-display area NDA, respectively, of the display device 1. Although not specifically illustrated, the display device 1 may further include a window member which covers the display panel and transmits images therethrough, and the window member may be disposed on the second substrate 300.

The backlight unit BLU may be, for example, an edge-type backlight unit or a direct-type backlight unit, but the inventive concepts are not limited thereto.

The first substrate 100 may include a plurality of pixels SPX. For example, the pixels SPX may be arranged in a matrix, but the inventive concepts are not limited thereto. A plurality of gate lines SGL1 through SGLm (where m is a natural number) and a plurality of data lines SDL1 through SDLn (where n is a natural number) may be disposed along the boundaries of the pixels SPX. Here, the gate lines SGL1 through SGLm may serve as selection lines for selecting the pixels SPX.

For convenience, FIG. 3 illustrates only one pixel SPX, but multiple pixels SPX may be defined on the first substrate 100. In each of the multiple pixels SPX, a pixel electrode may be disposed.

The gate lines SGL1 through SGLm may be disposed to intersect the data lines SDL1 through SDLn. The gate lines SGL1 through SGLm may extend in the first direction DR1 and may be electrically connected to a gate driver SGD. The data lines SDL1 through SDLn may extend in the second direction DR2 and may be connected to a data driver SDD.

The pixels SPX may be disposed to be electrically connected to the gate lines SGL1 through SGLm and the data lines SDL1 through SDLn. The pixels SPX may be arranged in, for example, a matrix, but the inventive concepts are not limited thereto.

The gate driver SGD may include one or more gate driver chips GDIC1. The gate driver SGD may include only one gate driver chip GDIC1 or may include a plurality of gate driver chips GDIC1. The gate driver SGD is illustrated as including four gate driver chips GDIC1, but the number of gate driver chips GDIC1 provided in the gate driver SGD is not particularly limited. The gate driver chips GDIC1 may be mounted on gate driver circuit boards GFPC1, and the gate driver circuit boards GFPC1 may be attached to a side of the display device 1 along the second direction DR2 in a tape carrier package (TCP) manner. Alternatively, the gate driver chips GDIC1 may be mounted on the first substrate 100 in a chip-on-glass (COG) manner. However, the inventive concepts are not particularly limited to these examples. In some embodiments, the gate driver SGD may be disposed in a predetermined area adjacent to at least one of the short sides of the first substrate 100.

The gate driver SGD may be formed during the fabrication of transistors for driving the pixels SPX and may be mounted on the first substrate 100 as an amorphous silicon TFT gate driver circuit (ASG) or an oxide silicon TFT gate driver circuit (OSG).

The data driver SDD may include one or more source driver chips SDIC1. The data driver SDD is illustrated as including five source driver chips SDIC1, but the number of source driver chips SDIC1 provided in the data driver SDD is not particularly limited.

A source driver circuit board SPCB1 may include, for example, a timing controller (not illustrated). The timing controller may be mounted on the source driver circuit board SPCB1 in the form of an IC and may be electrically connected to the gate driver SGD and the data driver SDD. The timing controller may output gate control signals, data control signals, and image data.

The gate driver SGD may receive the gate control signals from the timing controller. The gate driver SGD may generate gate signals in response to the gate control signals and may sequentially output the gate signals. The gate signals may be provided to the pixels SPX in units of rows via the gate lines SGL1 through SGLm. As a result, the pixels SPX may be driven in units of the rows.

The data driver SDD may receive the image data and the data control signals from the timing controller. The data driver SDD may generate and output data voltages, which are analog signals corresponding to the image data, in response to the data control signals. The data voltages may be provided to the pixels SPX via the data lines SDL1 through SDLn.

The pixels SPX may receive the data voltages via the data lines SDL1 through SDLn in response to the gate signals being provided thereto via the gate lines SGL1 through SGLm. The pixels SPX may display gradation corresponding to the data voltages, thereby controlling the transmittance of a region where the pixels SPX are disposed.

Flexible circuit boards SFPC1 are illustrated as being connected to the first and second substrates 100 and 300 along one of the long sides of each of the first and second substrates 100 and 300, but the inventive concepts are not limited thereto. The location where the flexible circuit boards SFPC1 are connected to the first and second substrates 100 and 300 may vary as necessary. Alternatively, the flexible circuit boards SFPC1 may be disposed adjacent to one of the short sides of each of the first and second substrates 100 and 300. Still alternatively, the flexible circuit boards SFPC1 may be disposed adjacent to both long sides of each of the first and second substrates 100 and 300. Yet still alternatively, the flexible circuit boards SFPC1 may be disposed adjacent to both short sides of each of the first and second substrates 100 and 300 or may be disposed adjacent to both long sides and both short sides of each of the first and second substrates 100 and 300.

Referring to FIG. 4, connection wires 115 may be disposed on the first substrate 100. First ends of first connection wires 115a, 115b, 115c, 115d, and 115e may be electrically connected to the data lines SDL(r+4), SDL(r+3), SDL(r+2), SDL(r+1), and SDLr, respectively, (where r is a natural number). Second ends of the first connection wires 115a, 115b, 115c, 115d, and 115e may be connected to connection pads PD. Accordingly, the connection pads PD may be electrically connected to the data lines SDLr through SDL (r+4).

The gate line SGLr may be disposed to intersect the data lines SDLr through SDL(r+4). Pixels SPXr through SPX(r+4) may be electrically connected to the gate line SGLr.

For convenience, only five first connection pads PD are illustrated in FIG. 5, but the number of connection wires electrically connected to the data lines SDLr through SDL (r+4) is not particularly limited.

The connection wires 115 have been described above as being electrically connected to the data lines SDLr through SDL(r+4), but the present disclosure is not limited thereto. Alternatively, the connection wires 115 and the connection pads PD may be electrically connected to the gate lines SGL1 through SGLm of FIG. 2 or other wires on the first substrate 100. The connection wires 115 will hereinafter be described as being electrically connected to the data lines SDLr through SDL(r+4).

The connection wires 115 may include, for example, copper (Cu), but the material of the connection wires 115 is not particularly limited.

Referring to FIG. 5, a source driver chip SDIC1, which is mounted on a flexible circuit board SFPC1, may generate data voltages for driving the pixels CPXr through CPX(r+4), which are electrically connected via a connecting pad 130. The generated data voltages may be transmitted to the data lines SDLr through SDL(r+4) via the connecting pad 130 and a connection pad PD.

The flexible circuit board SFPC1 may include a contact pad CP1. The source driver chip SDIC1 may be electrically connected to the contact pad CP1 of the flexible circuit board SFPC1. The contact pad CP1 of the flexible circuit board SFCP1 may be electrically connected to the connecting pad 130, which is disposed on a side of each of the first and second substrates 100 and 300, via an adhesive film 400.

The connecting pad 130 may be attached to the flexible circuit board SFPC1 via the adhesive film 400. For example, the connecting pad 130 may be electrically connected to the contact pad CP1 of the flexible circuit board SFPC1 via the adhesive film 400 in an outer lead bonding (OLB) manner.

For example, the adhesive film 400 may be disposed to cover the entire connecting pad 130, but the inventive concepts are not limited thereto. Alternatively, the adhesive film 400 may be disposed to cover part of the connecting pad 130 and expose part of the connecting pad 130.

In some embodiments, the adhesive film 400 may include an anisotropic conductive film (ACF). In a case where the adhesive film 400 is an ACF, the adhesive film 400 may have conductivity only in an area where the connecting pad 130 and the contact pad CP1 of the flexible circuit board SFPC1 are in contact with each other, and may electrically connect the connecting pad 130 and the contact pad CP1 of the flexible circuit board SFPC1, but the inventive concepts are not limited thereto. In some embodiments, the adhesive film 400 may not be provided. For example, the connecting pad 130 and the contact pad CP1 may be in direct contact with, and electrically connected to, each other, in which case, the connecting pad 130 and the contact pad CP1 may be directly connected to each other through ultrasonic bonding or welding.

The source driver circuit board SPCB1 may be electrically connected to the flexible circuit board SFPC1. Specifically, a contact pad CP2 of the flexible circuit board SFPC1 and a contact pad CP3 of the source driver circuit board SPCB1 may be electrically connected to each other, and as a result, the flexible circuit board SFPC1 and the source driver circuit board SPCB1 may be electrically connected to each other.

Accordingly, the source driver chip SDIC1 may be electrically connected to the source driver circuit board SPCB1.

In some embodiments, the flexible circuit board SFPC1 may be provided as a flexible printed circuit board (FPCB). Specifically, the flexible circuit board SFPC1 may be provided as a chip-on-film (COF). Accordingly, the data driver SDD may be connected to the first and second substrates 100 and 300 and the source driver circuit board SPCB1 in a tape carrier package (TCP) manner and may be bent toward the rear surface of the backlight unit BLU to be disposed at the rear surface of the backlight unit BLU, as indicated by dotted lines of FIG. 2. In this case, the source driver chip SDIC1 may be disposed between the backlight unit BLU and the flexible circuit board SFPC1, but the inventive concepts are not limited thereto. Alternatively, the source driver chip SDIC1 may be disposed on a surface of the flexible circuit board SFPC1 that does not face the backlight unit BLU.

The connecting pad 130 may be electrically connected to the connection pad PD, which is disposed on the first substrate 100. As described above, the connection pad PD may be electrically connected to a connection wire 115, and the connection wire 115 may extend in a direction from the connection pad PD to the inner side of the first substrate 100 (e.g., in the second direction DR2) to be electrically connected to the pixels SPX.

Referring to FIG. 6, the display device 1 may include the first substrate 100 and the second substrate 300, which faces the first substrate 100, on a side thereof.

The first and second substrates 100 and 300 may be rigid substrates formed of glass, quartz, or the like or may be flexible substrates formed of polyimide or another polymer resin. In a case where polyimide substrates are used as the first and second substrates 100 and 300, the display device 1 can become bendable, foldable, or rollable, and can thus be implemented in various shapes.

A connection wire 115 may be disposed on the first substrate 100, and an insulating layer 117 and a connection pad PD may be disposed on the connection wire 115. The connection wire 115 may be electrically connected to one of the data lines SDLr through SDL(r+4) and one of the gate lines SGL1 through SGLm of FIG. 2.

The insulating layer 117 may include a contact hole CTH which is disposed adjacent to one side of the first substrate 100 and exposes the connection wire 115. The insulating layer 117 may include an insulating material. For example, the insulating material may be an inorganic insulating material or an organic insulating material. The inorganic insulating material may include at last one of aluminum oxide, titanium oxide, silicon oxide, silicon oxynitride, zirconium oxide, and hafnium oxide. The organic insulating material may include at least one of an acrylic resin, a methacrylic resin, polyisoprene, a vinyl resin, an epoxy resin, a urethane resin, a cellulose resin, a siloxane resin, a polyimide resin, a polyamide resin, and a perylene resin.

The connection pad PD may be disposed in the contact hole CTH of the insulating layer 117 and on a part of the insulating layer 117 near the contact hole CTH. The connection pad PD may be in contact with the connection wire 115 through the contact hole CTH of the insulating layer 117. Accordingly, the connection pad PD may be electrically connected to the connection wire 115. The configuration of the connection pad PD, however, is not particularly limited. Alternatively, the connection pad PD may be disposed only in the contact hole CTH of the insulating layer 117 or may be formed in one integral body with the connection wire 115.

A black matrix BM, which is disposed on the second substrate 300 and an overcoat layer OC which covers the black matrix BM, may be disposed on the second substrate 300.

The black matrix BM may be disposed in a lattice pattern in a plan view. The black matrix BM can prevent color from being mixed due to light infiltrating between neighboring pixels SPX and can also prevent light from being output to the sides of the display device 1. The black matrix BM may be formed of an organic material or a metallic material including chromium (Cr), but the present disclosure is not limited thereto. Although not specifically illustrated, color filter patterns may be further disposed on the second substrate 300. The color filter patterns can improve the quality of images output by the display device 1.

The overcoat layer OC may be disposed on the black matrix BM. The overcoat layer OC may include an insulating material and may planarize height differences caused by the presence of the black matrix BM and the color filter patterns.

The liquid crystal layer 200, a spacer CS, and a sealant SL may be disposed between the first and second substrates 100 and 300.

The sealant SL may be disposed on the outside of the display area DA along the edges of each of the first and second substrates 100 and 300 to prevent leakage of the liquid crystal layer 200, which is filled between the first and second substrates 100 and 300. For example, the sealant SL and the display area DA may be spaced apart from each other, but the inventive concepts are not limited thereto.

The spacer CS maintains the cell gap between the first and second substrates 100 and 300 by being deformed when the first and second substrates 100 and 300 are assembled together after dropping liquid crystal molecules.

The spacer CS may include first and second spacers CS1 and CS2. In some embodiments, a width D2, in the second direction DR2, of the first spacer CS1 may be less than a width D4, in the second direction DR2, of the second spacer CS2. For example, the width D2, in the second direction DR2, of the first spacer CS1 may be 100 µm to 150 µm, and the width D4, in the second direction DR2, of the second spacer CS2 may be 153 µm to 180 µm. However, the inventive concepts are not limited to this. Alternatively, the width D2, in the second direction DR2, of the first spacer CS1 and the width D4, in the second direction DR2, of the second spacer CS2 may be the same. Still alternatively, the width D2, in the second direction DR2, of the first spacer CS1 may be greater than the width D4, in the second direction DR2, of the second spacer CS2.

The width D2, in the second direction DR2, of the first spacer CS1 and the width D4, in the second direction DR2, of the second spacer CS2 may each be less than a width D6, in the second direction DR2, of the sealant SL. For example, the width D6, in the second direction DR2, of the sealant SL may be 200 µm to 400 µm.

The first spacer CS1 may include a blue colorant. For example, the first spacer CS1 may be formed of blue photoresist, but the present disclosure is not limited thereto. In a case where the first spacer CS1 includes a blue colorant, side light leakage can be further effectively prevented. The structure of the spacer CS is not particularly limited. Alternatively, the first and second spacers CS1 and CS2 may both include a blue colorant.

The first spacer CS1 may be disposed on the first substrate 100, and the second spacer CS2 may be disposed on the second substrate 300. Specifically, the first spacer CS1 may be formed on the connection pad PD and the insulating layer 117, which are disposed on the first substrate 100, and the second spacer CS2 may be formed on the overcoat layer OC, which is disposed on the second substrate 300. The first and second spacers CS1 and CS2, which are formed on the first and second substrates 100 and 300, respectively, may be placed in contact with each other during the assembly of the first and second substrates 100 and 300 and may thus form the spacer CS, but the present disclosure is not limited thereto. Alternatively, the first and second spacers CS1 and CS2 may both be disposed on the second substrate 300. Still alternatively, the first and second spacers CS1 and CS2 may both be disposed on the first substrate 100.

The first and second spacers CS1 and CS2 may both be spaced apart from the sealant SL. For example, the first and second spacers CS1 and CS2 may both be spaced apart from the sealant SL in the second direction DR2. A distance D3 between the first spacer CS1 and the sealant SL may differ from a distance D5 between the second spacer CS2 and the sealant SL. For example, the distance D3 between the first spacer CS1 and the sealant SL may be 40 µm to 60 µm, and the distance D5 between the second spacer CS2 and the sealant SL may be 20 µm to 39 µm. However, the inventive concepts are not so limited. Alternatively, in a case where the distance D2, in the second direction DR2, of the first spacer CS1 and the distance D4, in the second direction DR2, of the second spacer CS2 are the same, the distance D3 between the first spacer CS1 and the sealant SL and the distance D5 between the second spacer CS2 and the sealant SL may be the same. Still alternatively, the distance D3 between the first spacer CS1 and the sealant SL may be greater than the distance D5 between the second spacer CS2 and the sealant SL.

For example, a common electrode for applying an electric field to the liquid crystal layer 200 together with pixel electrodes of the first substrate 100 may be disposed on the second substrate 300, but the inventive concepts are not limited thereto. Alternatively, the pixel electrodes and the common electrode may both be disposed on the first substrate 100.

Although not specifically illustrated, an optical sheet including a polarizing sheet may be disposed between the backlight unit BLU and the first substrate 100. The optical sheet can control the characteristics of light provided by the backlight unit BLU so as to control the light transmissivity of the display panel. Also, although not specifically illustrated, the display device 1 may further include a storage member (not illustrated) for housing the backlight unit BLU and the display panel therein.

A recess part TA may be disposed on at least one side surface of the display device 1 where the connecting pad 130 is disposed. For example, the recess part TA may be disposed on one of the side surfaces of the display device 1 corresponding to the long sides of the display device 1, but the present disclosure is not limited thereto. Alternatively, the recess part TA may be disposed on one of the side surfaces of the display device 1 corresponding to the short sides of the display device 1. Still alternatively, the recess part TA may be disposed on both one of the side surfaces of the display device 1 corresponding to the long sides of the display device 1 and one of the side surfaces of the display device 1 corresponding to the short sides of the display device 1.

The recess part TA may be formed in a direction from one side surface to the center of the display device 1, e.g., in the second direction DR2.

The recess part TA may be formed by the second substrate 200, which is disposed above the first substrate 100, and the spacer CS, which is disposed between the first and second substrates 100 and 300. For example, the spacer CS may be disposed on an inner side IS of a reference line RL, which is defined as a line extending from one side surface of the first substrate 100 in the third direction DR3. Specifically, the recess part TA may be formed by aligning side surfaces of the first and second substrates 100 and 300 with the reference line RL and moving the spacer CS away from the reference line RL in the second direction DR2, but the inventive concepts are not limited thereto. Alternatively, the recess part TA may be formed by reducing the width, in the second direction DR2, of the spacer CS.

A distance D1 by which the spacer CS is moved away from the reference line RL in the second direction DR2 may be 1 µm to 153 µm, but the inventive concepts are is not limited thereto. The distance D1 may vary depending on the widths and thicknesses of the spacer CS and the connection pad PD.

Due to the presence of the recess part TA, the top surface of the connection pad PD, a side surface of the spacer CS, and the bottom surface of the overcoat layer OC may be exposed. Specifically, in a case where the recess part TA is not provided, a side surface of the connection pad PD may be exposed. On the other hand, in a case where the recess part TA is provided, as illustrated in FIG. 7, not only the side surface of the connection pad PD, but also part of the top surface of the connection pad PD may be exposed. As a result, the connecting pad 130 can be connected not only to the side surface of the connection pad PD, but also to part of the top surface of the connection pad PD, and connection defects can be effectively prevented.

The entire connection pad PD, except for a part exposed by the recess part TA, may be covered by the first spacer CS1 and may overlap with the first and second spacers CS1 and CS2 in the third direction DR3. For example, a part of the connection pad PD may be exposed by the recess part TA, and the rest of the connection pad PD may overlap with the first and second spacers CS1 and CS2 in a thickness direction, i.e., in the third direction DR3.

FIG. 7 illustrates only the first spacer CS1 to explain the arrangement of the first spacer CS1 relative to each connection pad PD. Referring to FIG. 7, the width to which the top surface of each connection pad PD is exposed may be the same as the distance D1 by which the first spacer CS1 is moved away from the reference line RL in the second direction DR2, but the inventive concepts are not limited thereto. In some embodiments, in a case where each connection pad PD does not extend to the reference line RL, but are disposed on the inner side IS of the reference line RL, the width to which the top surface of each connection pad PD is exposed may be less than the distance D1 by which the first spacer CS1 is moved away from the reference line RL in the second direction DR2. In some embodiments, each connection pad PD may be disposed on an outer side OS of the reference line RL, in which case, the width to which the top surface of each connection pad PD is exposed may be greater than the distance D1 by which the first spacer CS1 is moved away from the reference line RL in the second direction DR2.

FIG. 7 illustrates that the first spacer CS1 is retreated in the second direction DR2 in both an area where each connection pad PD is disposed and an area where each connection pad PD is not disposed, but the inventive concepts are not limited thereto. Alternatively, the first spacer CS1 may be selectively retreated only in the area where each connection pad PD is disposed, but not in the area where each connection pad PD is not disposed. Although not specifically illustrated, the second spacer CS2 may have the same arrangement as the first spacer CS1.

In a cross-sectional view, the recess part TA may have a rectangular shape with one side opened, formed by the top surface of each connection pad PD, the side surface of the spacer CS, and the bottom surface of the overcoat layer OC, but the present disclosure is not limited thereto. The shape of the recess part TA is not particularly limited. Alternatively, the recess part TA may have a semicircular shape or a triangular shape with one side thereof open.

In a plan view, the recess part TA may have a bar shape exposing each connection pad PA, but the inventive concepts are not limited thereto. Alternatively, in a plan view, the recess part TA may have a shape in which a plurality of semicircles, a plurality of triangles, or a plurality of rectangles are arranged in a row in the first direction DR1.

Referring to FIG. 5, the connecting pad 130 may be disposed to fill the recess part TA. For example, the connecting pad 130 may include a first portion 130a, which is disposed on the outer side OS of the reference line RL, and a second portion 130b, which is disposed on the inner side IS of the reference line RL and is located in the recess part TA.

The first portion 130a of the connecting pad 130 may be disposed between the adhesive film 400 and the second portion 130b of the connecting pad 130 and may electrically connect the second portion 130b of the connecting pad 130 and the adhesive film 400. One surface of the first portion 130a may be in contact with the side surface of the first substrate 100, a side surface of the connection wire 115, the side surface of the connection pad PD, the second portion 130b, a side surface of the overcoat layer OC, a side surface of the black matrix BM, and the side surface of the second substrate 300, but the present disclosure is not limited thereto. Alternatively, the first portion 130a may not be in contact with some of the side surface of the first substrate 100, the side surface of the connection wire 115, the side surface of the connection pad PD, the second portion 130b, the side surface of the overcoat layer OC, the side surface of the black matrix BM, and the side surface of the second substrate 300. For example, in a case where the overcoat layer OC and the black matrix BM do not extend to the reference line RL, the first portion 130a of the connecting pad 130 may not be in contact with the overcoat layer OC and the black matrix BM. As the first portion 130a of the connecting pad 130 is in contact with the side surfaces of the first and second substrates 100 and 300, the connecting pad 130 can be stably fastened to the display device 1.

The second portion 130b of the connecting pad 130 may be in contact with the top surface of the connection pad PD, the side surface of the spacer CS, and the bottom surface of the overcoat layer OC and may be disposed along the surface profile of the recess part TA. However, the inventive concepts are not limited to this. Which elements are in contact with the second portion 130b may vary depending on the material of the connecting pad 130 and how to fabricate the connecting pad 130. For example, the second portion 130b of the connecting pad 130 may be in contact with the top surface of the connection pad PD, but not with the side surface of the spacer CS and the bottom surface of the overcoat layer OC. Alternatively, the second portion 130b of the connecting pad 130 may be in contact with the top surface of the connection pad PD and the side surface of the spacer CS, but not with the bottom surface of the overcoat layer OC. In short, the second portion 130b of the connecting pad 130 may be in contact with the connection pad PD, and as a result, the second portion 130b of the connecting pad 130 and the connection pad PD may be electrically connected to each other.

The connecting pad 130 may be formed of aluminum (Al) or silver (Ag), but the inventive concepts are not limited thereto.

The adhesive film 400 may be disposed on the outside of the connecting pad 130. The adhesive film 400 may electrically connect the connecting pad 130 and the contact pad CP1 of the flexible circuit board SFPC1. The length, in the third direction DR3, of the first portion 130a of the connecting pad 130 and the length, in the third direction DR3, of the adhesive film 400 may be the same, but the inventive concepts are not limited thereto. Alternatively, the length, in the third direction DR3, of the first portion 130a of the connecting pad 130 and the length, in the third direction DR3, of the adhesive film 400 may differ from each other. For example, the length, in the third direction DR3, of the first portion 130a of the connecting pad 130 may be greater than the length, in the third direction DR3, of the adhesive film 400. Alternatively, the length, in the third direction DR3, of the first portion 130a of the connecting pad 130 may be less than the length, in the third direction DR3, of the adhesive film 400. In this manner, the connecting pad 130 and the contact pad CP1 may be electrically connected to each other by the adhesive film 400.

In some embodiments, the adhesive film 400 may not be provided, and instead, the connecting pad 130 and the contact pad CP1 may be in direct contact with, and electrically connected to, each other. For example, the connecting pad 130 and the contact pad CP1 may be directly coupled to each other through ultrasonic bonding or welding. The electrical connection between the flexible circuit board SFPC1 and the source driver circuit board SPCB1 has already been described above with reference to FIG. 5, and thus, a detailed description thereof will be omitted.

In short, the connecting pad 130 may be disposed on the side surfaces of the first and second substrates 100 and 300 for electrical connection with the flexible circuit board SFPC1. Since the connecting pad 130 is disposed on at least one side surface of the display device 1, the size of the non-display area NDA can be minimized. Also, since the spacer CS is disposed on the inner side IS of the reference line RL without a requirement of an additional process, the recess part TA may be formed on at least one side surface of the display device 1. Also, due to the presence of the recess part TA, the top surface of the connection pad PD can be exposed, and the connecting pad 130 can be in contact with the side surface and the top surface of the connection pad PD. Accordingly, the contact area of the connecting pad 130 and the connection pad PD can be widened, and a contact defect that may occur between the connecting pad 130 and the connection pad PD can be effectively prevented.

Figure 8:
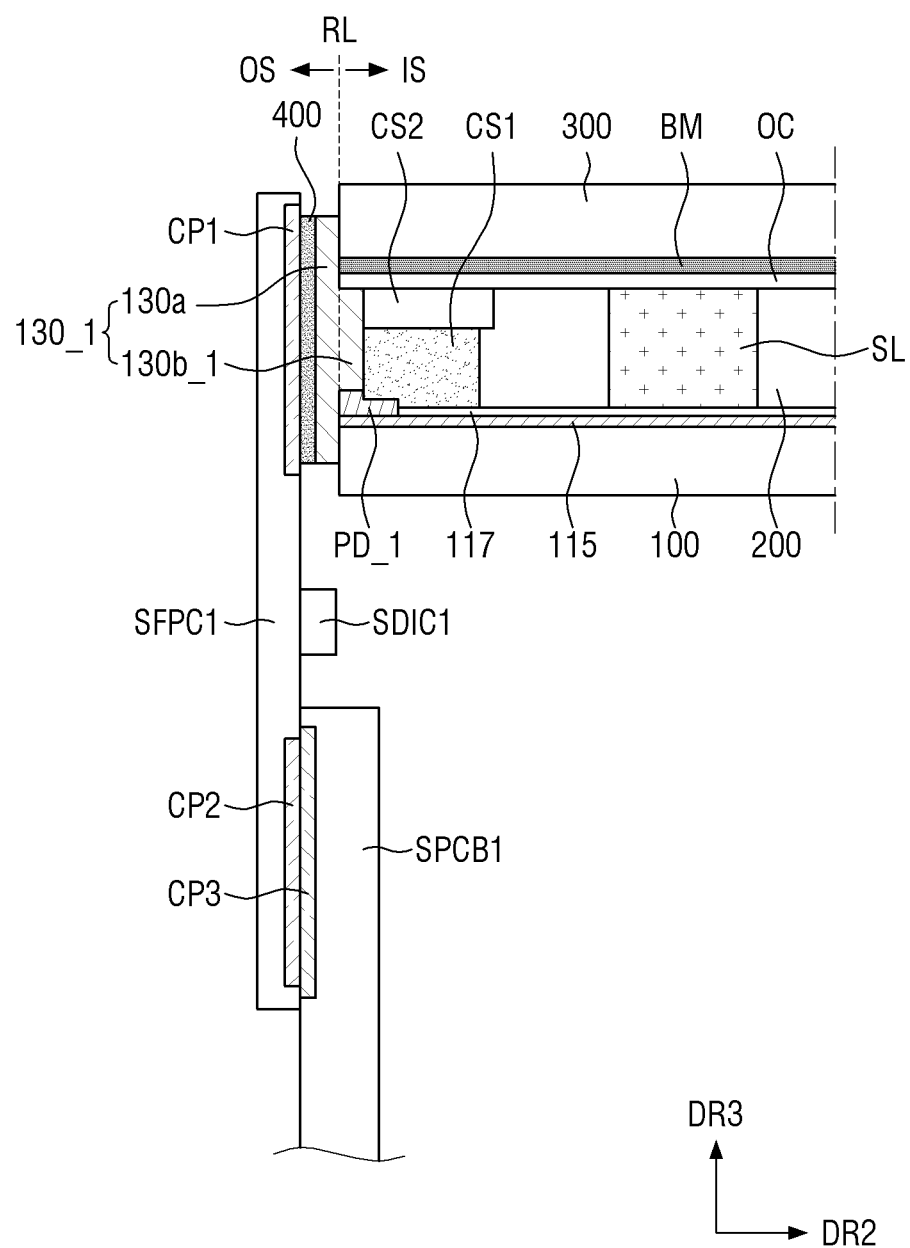
FIG. 8 is a cross-sectional view, taken along line A-A' of FIG. 2, of a display device according to another example embodiment of the present invention.
Figure 9:
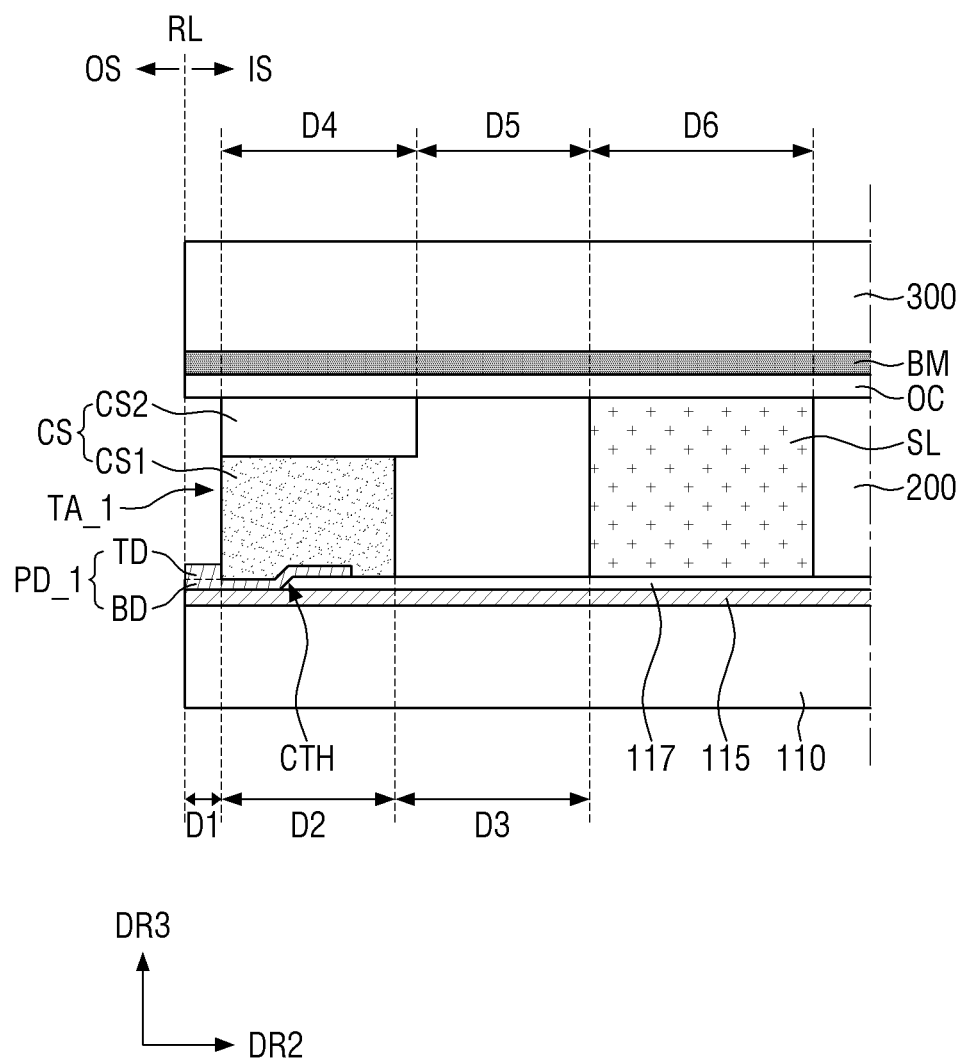
FIG. 9 is a cross-sectional view for explaining each connection pad of the display device of FIG. 8.

FIG. 8 is a cross-sectional view, taken along line A-A' of FIG. 2, of a display device according to another inventive concepts are embodiment of the present invention; FIG. 9 is a cross-sectional view for explaining each connection pad of the display device of FIG. 8; and FIG. 10 is a perspective view illustrating how in the display device of FIG. 8, each connection pad disposed on a first substrate is arranged with respect to a first spacer.

Figure 10:
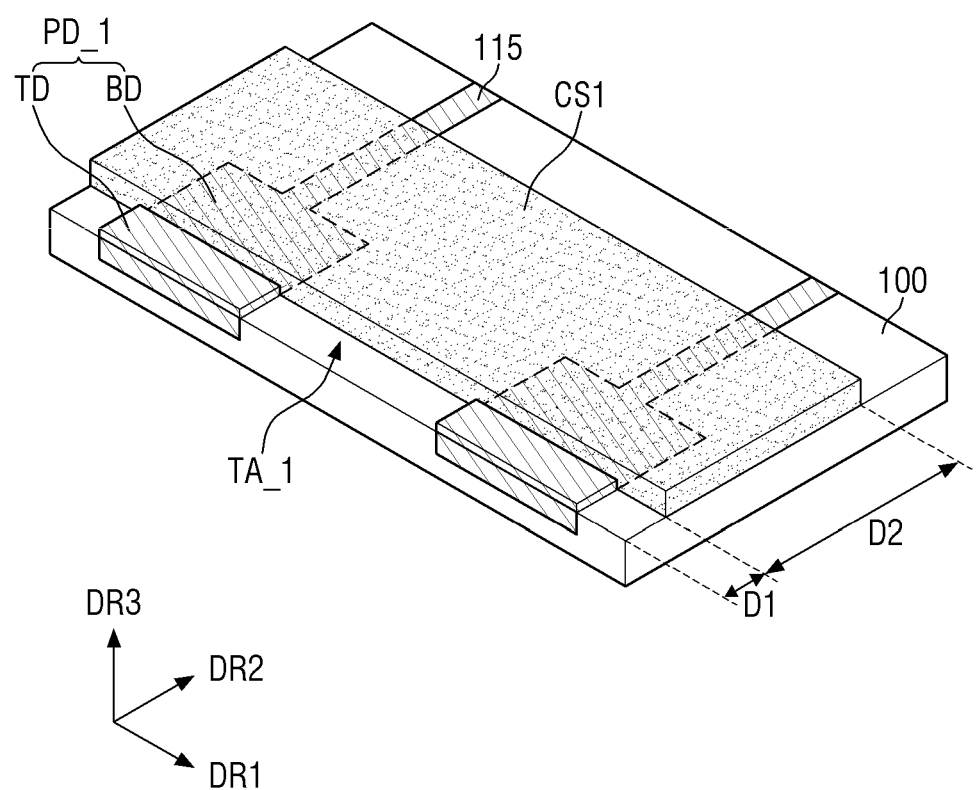
FIG. 10 is a perspective view illustrating how in the display device of FIG. 8, each connection pad disposed on a first substrate is arranged with respect to a first spacer.

The example embodiment of FIGS. 8 through 10 differs from the example embodiment of FIGS. 5 through 7 in that a tail part TD is formed in each connection pad PD_1. The example embodiment of FIGS. 8 through 10 will hereinafter be described, focusing mainly on this and other differences with the example embodiment of FIGS. 5 through 7.

Referring to FIGS. 8 through 10, a connection wire 115 may be disposed on a first substrate 100, and an insulating layer 117 and a connection pad PD_1 may be disposed on the connection wire 115.

The insulating layer 117 may include a contact hole CTH which is disposed adjacent to one side of the first substrate 100 and exposes the connection wire 115, and the connection pad PD_1 may be disposed in the contact hole CTH of the insulating layer 117 and on a part of the insulating layer 117 near the contact hole CTH.

The connection pad PD_1 may include a body part BD which is disposed in the contact hole CTH of the insulating layer 117 and on a part of the insulating layer 117 near the contact hole CTH and a tail part TD which protrudes from the body part BD in a third direction DR3 near a reference line RL.

A recess part TA_1 may be formed in a direction from one side surface to the center of a display device 1, e.g., in a second direction DR2.

Due to the presence of the recess part TA_1, the top surface of the tail part TD of the connection pad PD_1, a side surface of a spacer CS, and the bottom surface of an overcoat layer OC may be exposed. Specifically, the top surface of the tail part TD of the connection pad PD_1 may be exposed by the recess part TA_1, part of the top surface of the body part BD of the connection pad PD_1 may overlap with the tail part TD of the connection pad PD_1 in the third direction DR3, and the rest of the top surface of the body part BD may overlap with the spacer CS in the third direction DR3. When the tail part TD is provided, a side surface of the connection pad PD_1 can be widened, and as a result, the contact area of the connection pad PD_1 and a connecting pad 130_1 can be further widened. The tail part TD of the connection pad PD_1 may be formed by polishing the connection pad PD_1 at an inclination, but the inventive concepts are not limited thereto. Alternatively, the tail part TD of the connection pad PD_1 may be formed by an additional deposition process.

The width, in the second direction DR2, of the connection pad PD_1 may be the same as a distance D1 by which the spacer CS is moved away from the reference line RL in the second direction DR2, but the inventive concepts are not limited thereto. Alternatively, the width, in the second direction DR2, of the connection pad PD_1 may differ from the distance D1 by which the spacer CS is moved away from the reference line RL in the second direction DR2. For example, the width, in the second direction DR2, of the connection pad PD_1 may be less than the distance D1 by which the spacer CS is moved away from the reference line RL in the second direction DR2.

In a case where the width, in the second direction DR2, of the connection pad PD_1 is less than the distance D1 by which the spacer CS is moved away from the reference line RL in the second direction DR2, one end of the tail part TD may not be in contact with a first spacer CS1, and the other end of the tail part TD may be aligned with the reference line RL. However, the inventive concepts are not limited to this.

Alternatively, one end of the tail part TD may be in contact with the first spacer CS1, and the other end of the tail part TD may be disposed on an inner side IS of the reference line RL. Still alternatively, one end of the tail part TD may not be in contact with the first spacer CS1, and the other end of the tail part TD may be disposed on the inner side IS of the reference line RL.

The height, in the third direction DR3, of the tail part TD of the connection pad PD_1 may be greater than the height, in the third direction DR3, of the body part BD of the connection pad D_1, but the inventive concepts are not limited thereto. Alternatively, the height, in the third direction DR3, of the tail part TD of the connection pad PD_1 may be less than the height, in the third direction DR3, of the body part BD of the connection pad D_1. Still alternatively, the height, in the third direction DR3, of the tail part TD of the connection pad PD_1 may be the same as the height, in the third direction DR3, of the body part BD of the connection pad PD_1.

FIG. 10 illustrates that the first spacer CS1 is retreated in the second direction DR2 in both an area where the tail part TD of each connection pad PD_1 is disposed and an area where the tail part TD of each connection pad PD_1 is not disposed, but the present disclosure is not limited thereto. Alternatively, the first spacer CS1 may be selectively retreated in the area where the tail part TD of each connection pad PD_1 is disposed. Although not specifically illustrated, a second spacer CS2 may have the same arrangement as the first spacer CS1.

FIGS. 8 through 10 illustrate that the tail part TD has a rectangular shape in a cross-sectional view, but the inventive concepts are not limited thereto. That is, the tail part may have various shapes other than a rectangular shape, such as a semicircular shape, a polygonal shape, or an amorphous shape, in a cross-sectional view.

In a plan view, the tail part TD may be in the shape of a bar disposed on the body part BD and extending in a first direction DR1, but the inventive concepts are not limited thereto. Alternatively, in a plan view, the tail part TD may have a shape in which a plurality of semicircles, a plurality of triangles, or a plurality of rectangles are arranged in a row in the first direction DR1.

The recess part TA_1 may have a height difference between the area where the tail part TD of each connection pad PD_1 is disposed and the area where the tail part TD of each connection pad PD_1 is not disposed. For example, the recess part TA_1 may be formed to be deeper in the first direction DR1 in the area where the tail part TD of each connection pad PD_1 is not disposed than in the area where the tail part TD of each connection pad PD_1 is disposed.

Referring to FIGS. 8 and 9, a connecting pad 130_1 may be disposed to fill the recess part TA_1. For example, the connecting pad 130_1 may include a first portion 130a, which is disposed on an outer side OS of the reference line RL, and a second portion 130b_1, which is disposed on the inner side IS of the reference line RL and is located in the recess part TA_1.

The second portion 130b_1 of the connecting pad 130_1 may be in contact with the top surface of the tail part TD of the connection pad PD_1, the side surface of the spacer CS, and the bottom surface of the overcoat layer OC and may be disposed along the surface profile of the recess part TA_1. However, the inventive concepts are not limited to this. Alternatively, in a case where the width, in the second direction DR2, of the tail part TD of the connection pad PD_1 is less than the distance D1 by which the spacer CS is moved away from the reference line RL in the second direction DR2, the second portion 130b_1 of the connecting pad 130_1 may be in contact with the top surface and a side surface of the tail part TD of the connection pad PD_1 and part of the top surface of the body part BD of the connection pad PD_1.

In a case where the connection pad PD_1 is formed to include the tail part TD, the side surface of the connection pad PD_1 can be widened, and as a result, the contact area of the connection pad PD_1 and the connecting pad 130_1 can be further widened. Accordingly, a contact defect that may occur between the connecting pad 130_1 and the connection pad PD_1 can be effectively prevented.

Figure 11:
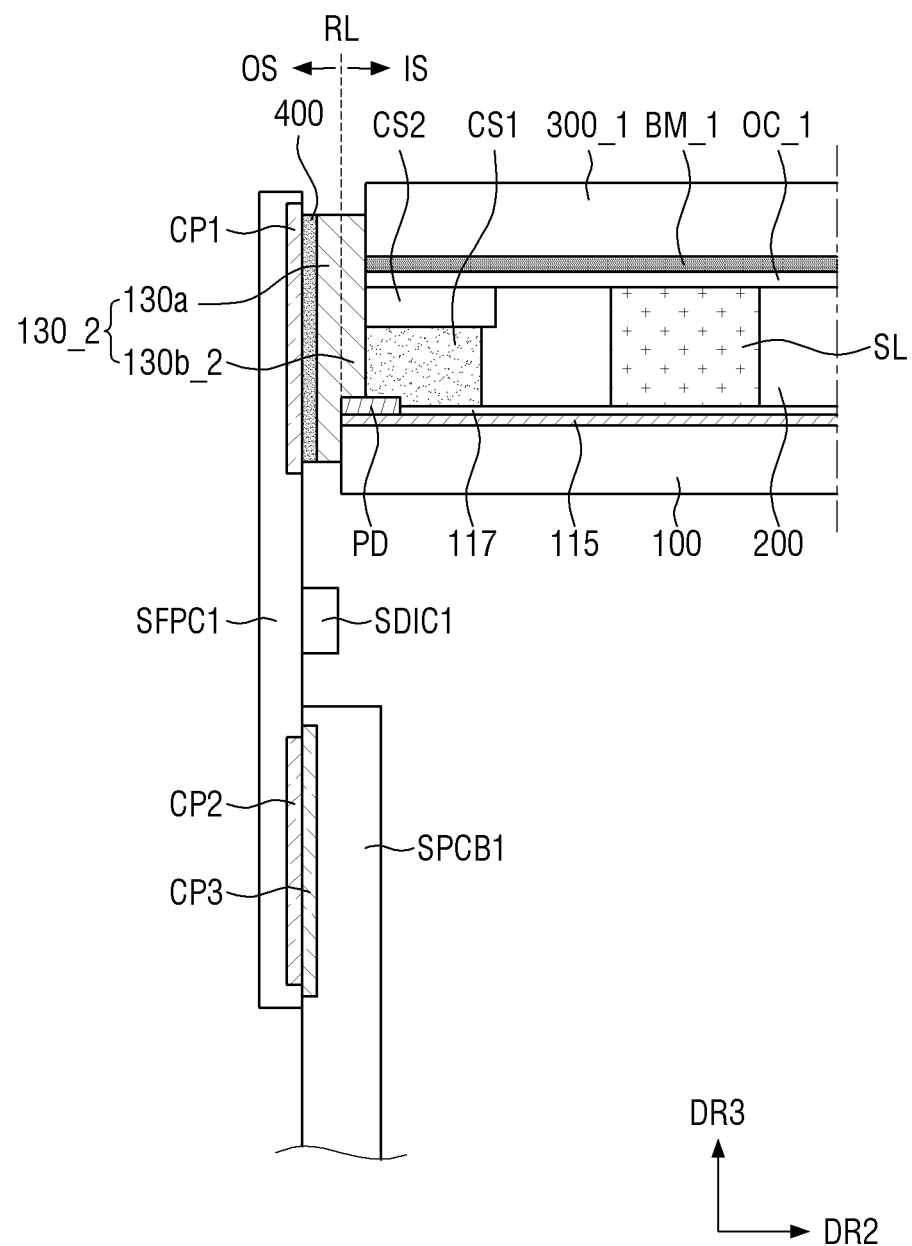
FIG. 11 is a cross-sectional view, taken along line A-A' of FIG. 2, of a display device according to another example embodiment of the present invention.
Figure 12:
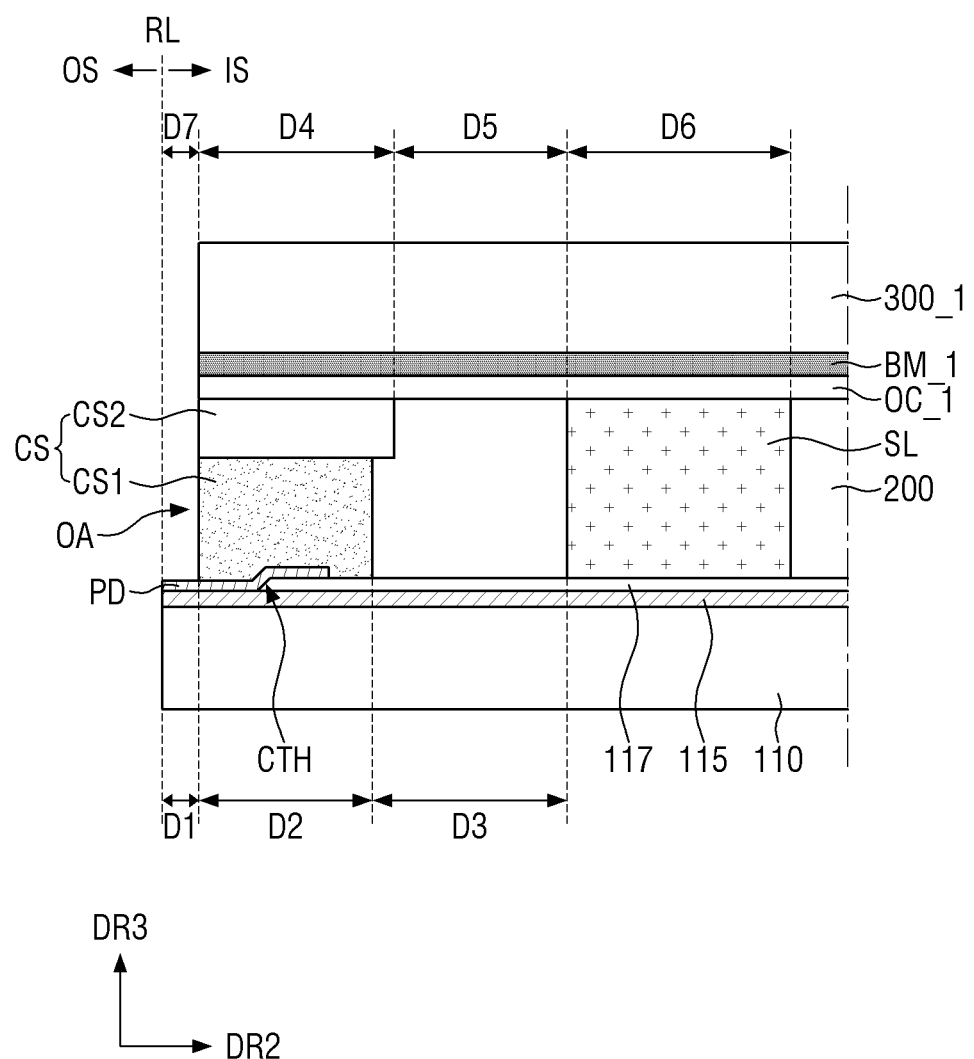
FIG. 12 is a cross-sectional view for explaining each connection pad of the display device of FIG. 11.

FIG. 11 is a cross-sectional view, taken along line A-A' of FIG. 2, of a display device according to another example embodiment of the present invention; FIG. 12 is a cross-sectional view for explaining each connection pad of the display device of FIG. 11; and FIG. 13 is a perspective view illustrating how elements disposed on a first substrate are arranged with respect to elements disposed on a second substrate in the display device of FIG. 11.

Figure 13:
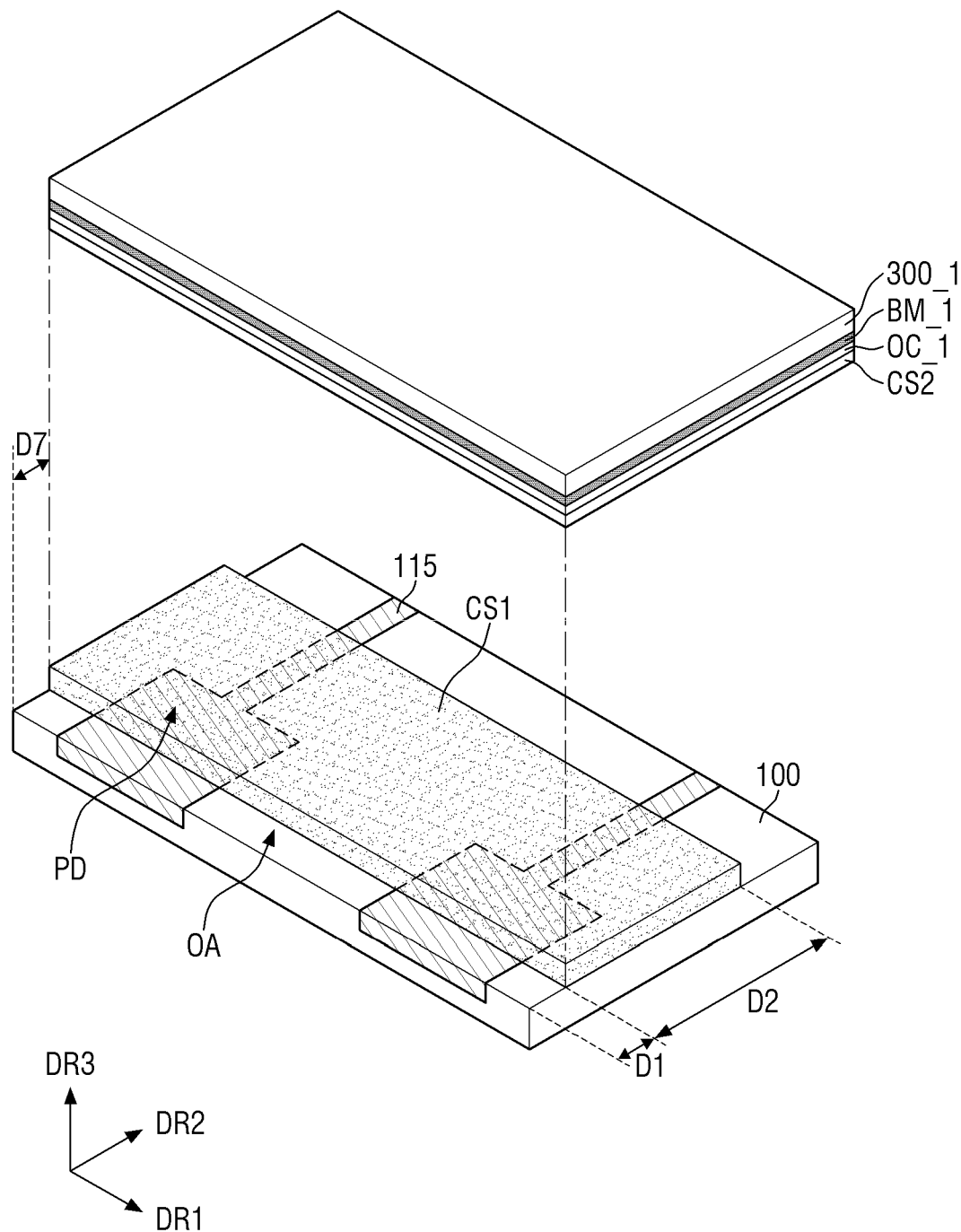
FIG. 13 is a perspective view illustrating how elements disposed on a first substrate are arranged with respect to elements disposed on a second substrate in the display device of FIG. 11.

The example embodiment of FIGS. 11 through 13 differs from the example embodiment of FIGS. 5 through 7 in that a second substrate 300_1 and a spacer CS are both retreated into an inner side IS of a reference line RL. The example embodiment of FIGS. 11 through 13 will hereinafter be described, focusing mainly on this and other differences with the example embodiment of FIGS. 5 through 7.

Referring to FIGS. 11 through 13, a display device 1 may include a first substrate 100 and the second substrate 300_1, which faces the first substrate 100, on one side thereof.

The second substrate 300_1 may be disposed on the inner side IS of the reference line RL, which is defined as a line extending from one side surface of the first substrate 100 in a third direction DR3. Specifically, side surfaces of the first substrate 100, a connection wire 115, and a connection pad PD may be aligned with the reference line RL in the third direction DR, and the second substrate 300_1, a black matrix BM_1, an overcoat layer OC_1, and the spacer CS may be moved away from the reference line RL in a second direction DR2.

An open part OA may be disposed above the connection pad PD. The open part OA may be formed by moving the second substrate 300_1, the black matrix BM_1, the overcoat layer OC_1, and the spacer CS away from the reference line RL in the second direction DR2.

Side surfaces of the second substrate 300_1, the black matrix BM_1, the overcoat layer OC_1, and the spacer CS may be aligned with one another in the third direction DR3. In this case, a distance D7 by which the second substrate 300_1 is moved away from the reference line RL in the second direction DR2 may be the same as a distance D1 by which the spacer CS is moved away from the reference line RL in the second direction DR2, but the inventive concepts are not limited thereto. Alternatively, the side surfaces of the second substrate 300_1, the black matrix BM_1, the overcoat layer OC_1, and the spacer CS may not be aligned with one another in the third direction DR3. For example, in some embodiments, the spacer CS may be moved further than the second substrate 300_1 into the inner side IS of the reference line RL, in which case, the distance D1 by which the spacer CS is moved away from the reference line RL in the second direction DR2 may be greater than the distance D7 by which the second substrate 300_1 is moved away from the reference line RL in the second direction DR2.

The open part OA may be formed in a direction from one side surface to the center of the first substrate 100, e.g., in the second direction DR2.

Due to the presence of the open part OA, the top surface of the connection pad PD, the side surface of the spacer CS, the side surface of the overcoat layer OC_1, the side surface of the black matrix BM_1, and the side surface of the second substrate 300_1 may be exposed. Specifically, part of the top surface of the connection pad PD may be exposed by the open part OA, and the rest of the top surface of the connection pad PD may be covered by a first spacer CS1 and may overlap with the first spacer CS1 and a second spacer CS2 in the third direction DR3.

The width to which the connection pad PD is exposed in the second direction DR2 by the open part OA may be the same as the distance D1 by which the spacer CS is moved away from the reference line RL in the second direction DR2, but the inventive concepts are not limited thereto.

Referring to FIG. 11, a connecting pad 130_2 may be disposed to fill the open part OA. For example, the connecting pad 130_2 may include a first portion 130a which is disposed on an outer side OS of the reference line RL and a second portion 130b_2, which is disposed on the inner side IS of the reference line RL and is located in the open part OA.

The second portion 130b_2 of the connecting pad 130_2 may be in contact with the top surface of the connection pad PD, the side surface of the spacer CS, the bottom surface of the overcoat layer OC_1, the side surface of the black matrix BM_1, and the side surface of the second substrate 300_1.

In a case where the second substrate 300_1, the black matrix BM_1, the overcoat layer OC_1, and the spacer CS are moved away from the reference line RL in the second direction DR2 to form the open part OA, the top surface of the connection pad PD can be exposed, and as a result, the contact area of the connection pad PD and the connecting pad 130_2 can be widened. Accordingly, a contact defect that may occur between the connecting pad 130_2 and the connection pad PD can be effectively prevented.

Also, since the second portion 130b_2 of the connecting pad 130_2 is in contact with the side surfaces of the spacer CS, the overcoat layer OC_1, the black matrix BM_1, and the second substrate 300_1, the connecting pad 130_2 can be further stably fastened to the display device 1.

Figure 14:
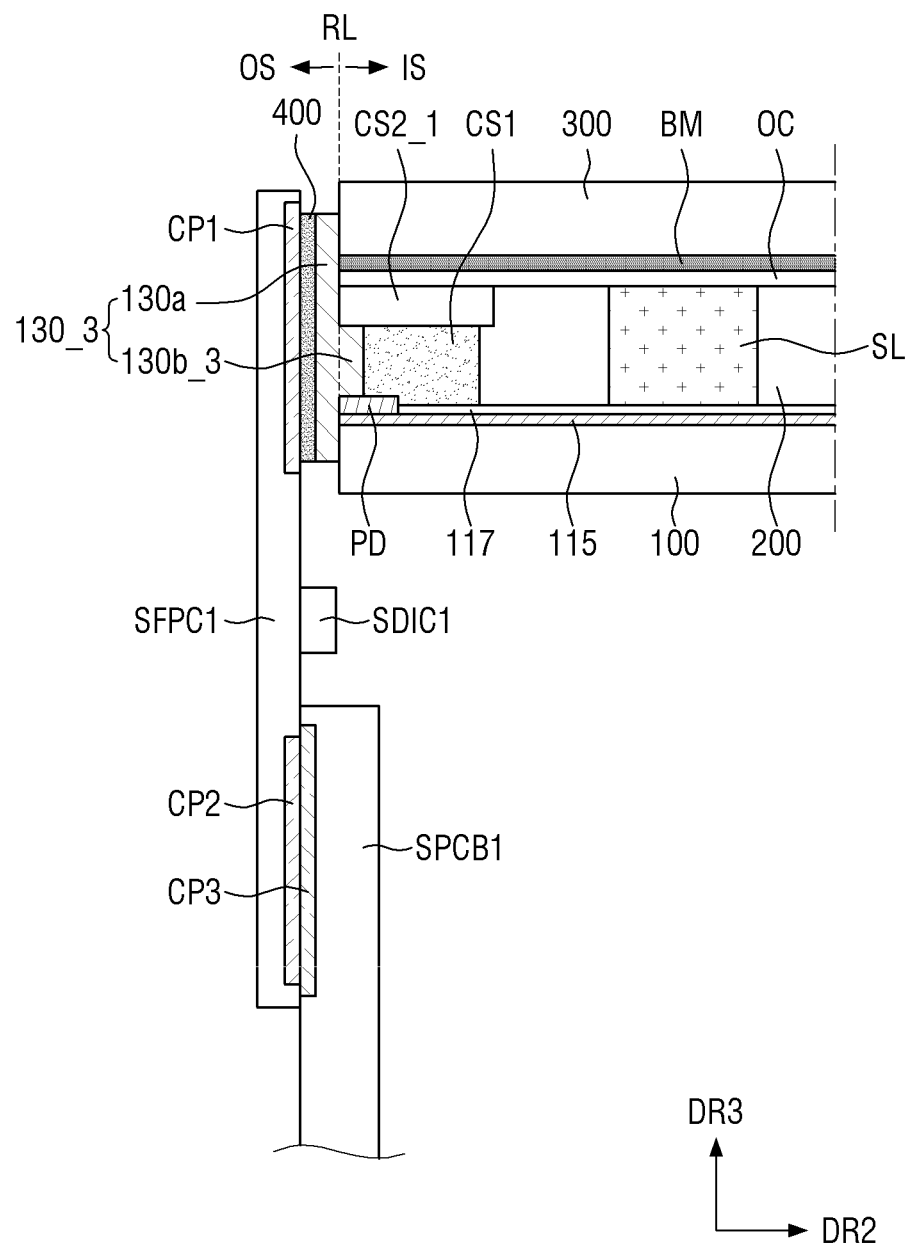
FIG. 14 is a cross-sectional view, taken along line A-A' of FIG. 2, of a display device according to another example embodiment of the present invention.
Figure 15:
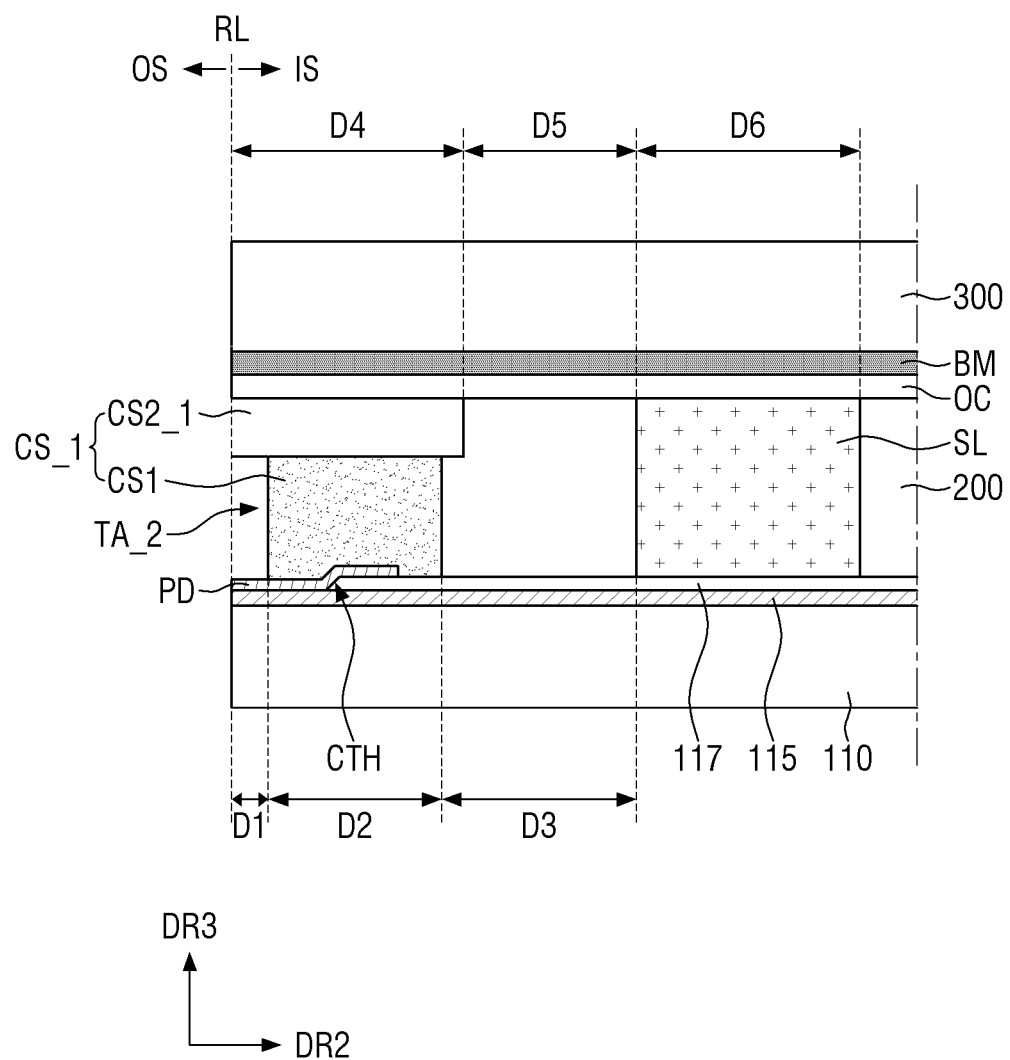
FIG. 15 is a cross-sectional view for explaining each connection pad of the display device of FIG. 14.

FIG. 14 is a cross-sectional view, taken along line A-A' of FIG. 2, of a display device according to another example embodiment of the present invention; FIG. 15 is a cross-sectional view for explaining each connection pad of the display device of FIG. 14; and FIG. 16 is a perspective view illustrating how elements disposed on a first substrate are arranged with respect to elements disposed on a second substrate in the display device of FIG. 14.

Figure 16:
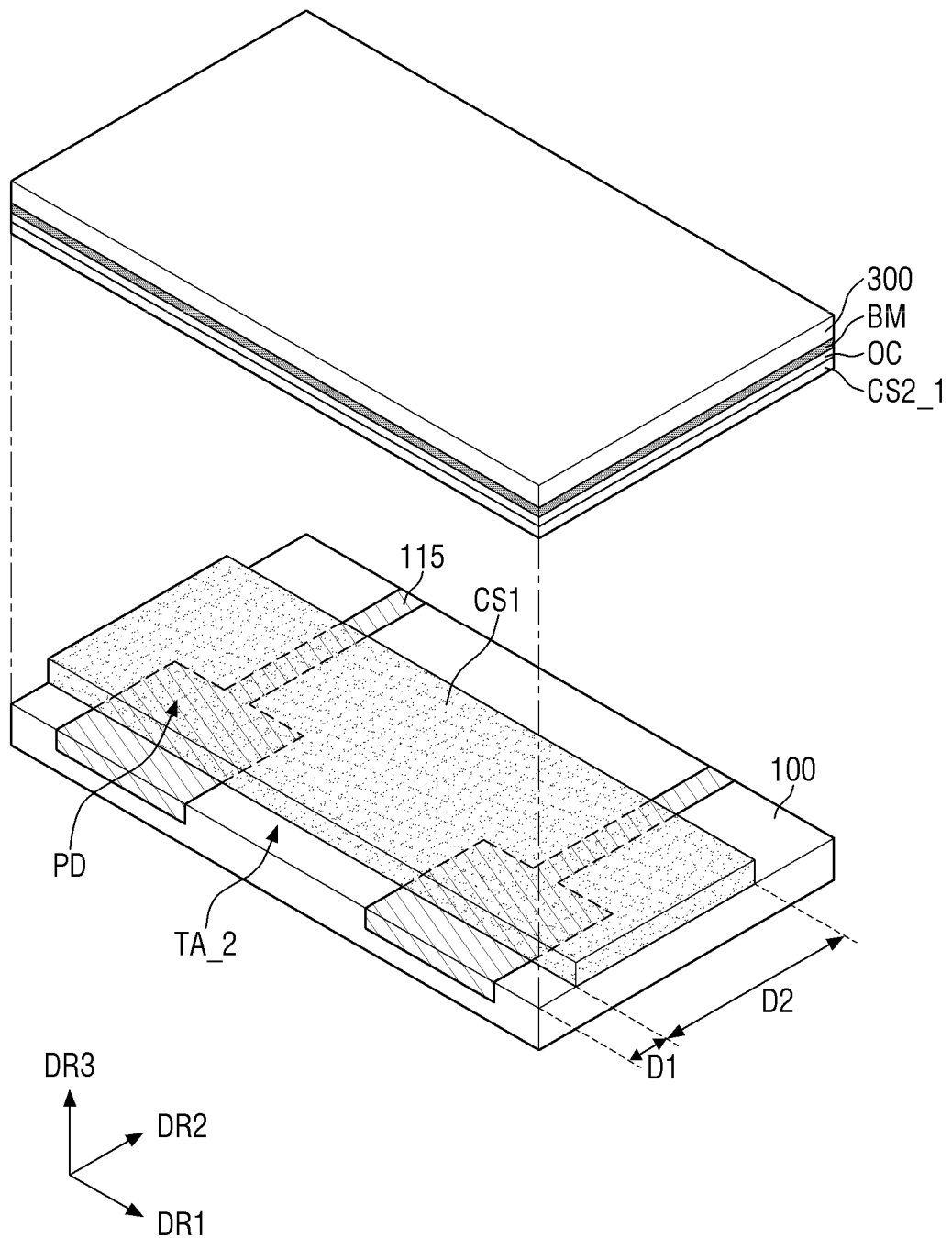
FIG. 16 is a perspective view illustrating how elements disposed on a first substrate are arranged with respect to elements disposed on a second substrate in the display device of FIG. 14.

The example embodiment of FIGS. 14 through 16 differs from the example embodiment of FIGS. 5 through 7 in that a first spacer CS1 is retreated into an inner side IS of a reference line RL, and that a second spacer CS2_1 is aligned with the reference line RL. The example embodiment of FIGS. 14 through 16 will hereinafter be described, focusing mainly on this and other differences with the example embodiment of FIGS. 5 through 7.

Referring to FIGS. 14 through 16, a display device 1 may include a first substrate 100 and a second substrate 300, which faces the first substrate 100, on one side thereof.

The first spacer CS1 may be disposed on an inner side IS of a reference line RL, which is defined as a line extending from one side surface of the first substrate 100 in a third direction DR3. Specifically, side surfaces of the first substrate 100, a connection wire 115, a connection pad PD, the second substrate 300, a black matrix BM, an overcoat layer OC, and the second spacer CS2_1 may be aligned with the reference line RL in the third direction DR3, and the first spacer CS1 may be moved away from the reference line RL in a second direction DR2.

A recess part TA_2 may be formed in a direction from one side surface to the center of the display device 1 to the center of the display device 1, e.g., in the second direction DR2.

Due to the presence of the recess part TA_2, the top surface of the connection pad PD, a side surface of the first spacer CS1, and the bottom surface of the second spacer CS2_1 may be exposed. Specifically, part of the top surface of the connection pad PD may be exposed by the recess part TA_2, and the rest of the top surface of the connection pad PD may be covered by the first spacer CS1 and may overlap with the first spacer CS1 in the third direction DR3.

The width to which the connection pad PD is exposed in the second direction DR2 by the recess part TA_2 may be the same as a distance D1 by which the first spacer CS1 is moved away from the reference line RL in the second direction DR2.

FIG. 16 illustrates that the first spacer CS1 is retreated in both in the second direction DR2 in both an area where each connection pad PD is disposed and an area where each connection pad PD is not disposed, but the inventive concepts are not limited thereto. Alternatively, the first spacer CS1 may be selectively retreated only in the area where each connection pad PD is disposed, but not in the area where each connection pad PD is not disposed.

A width D4, in the second direction DR2, of the second spacer CS2_1 may be greater than a width D2, in the second direction DR2, of the first spacer CS1. One side surface of the second spacer CS2_1 may protrude beyond the first spacer CS1 in the opposite direction of the second direction DR2, and the other side surface of the second spacer CS2_1 may protrude beyond the first spacer CS1 in the second direction DR2. However, the inventive concepts are not limited to this. Alternatively, one side surface of the second spacer CS2_1 may protrude beyond the first spacer CS1 in the opposite direction of the second direction DR2, but the other side surface of the second spacer CS2_1 may be aligned with the first spacer CS1 in the third direction DR3. Still alternatively, one side surface of the second spacer CS2_1 may protrude beyond the first spacer CS1 in the opposite direction of the second direction DR2, but the first spacer CS1 may protrude beyond the other side surface of the second spacer CS2_1 in the second direction DR2.

Referring to FIG. 14, a connecting pad 130_3 may be disposed to fill the recess part TA_2. For example, the connecting pad 130_3 may include a first portion 130a which is disposed on an outer side OS of the reference line RL and a second portion 130b_3 which is disposed on the inner side IS of the reference line RL and is located in the recess part TA_2.

The second portion 130b_3 of the connecting pad 130_3 may be in contact with the top surface of the connection pad PD, the side surface of the first spacer CS1, and the bottom surface of the second spacer CS2_1 and may be disposed along the surface profile of the recess part TA_2. However, the inventive concepts are not limited to this. Alternatively, the second portion 130b_3 of the connecting pad 130_3 may be in contact with the top surface of the connection pad PD, but not with the side surface of the first spacer CS1 and the bottom surface of the second spacer CS2_1. Still alternatively, the second portion 130b_3 of the connecting pad 130_3 may be in contact with the top surface of the connection pad PD and the side surface of the first spacer CS1, but not with the bottom surface of the second spacer CS2_1.

In a case where the recess part TA_2, which exposes part of the top surface of the connection pad PD, is formed by moving the first spacer CS1 away from the reference line RL in the second direction DR2, the connecting pad 130_3 can be in contact with the side surface and the top surface of the connection pad PD, and as a result, a contact defect that may occur between the connecting pad 130_3 and the connection pad PD can be effectively prevented.

Also, since the recess part TA_2 is formed by moving only the first spacer CS1 away from the reference line RL in the second direction DR2, the height, in the third direction DR3, of the recess part TA_2 can be reduced, and as a result, the second portion 130b_3 of the connecting pad 130_3 can be further stably formed in the recess part TA_2 during the formation of the connecting pad 130_3.

Figure 17:
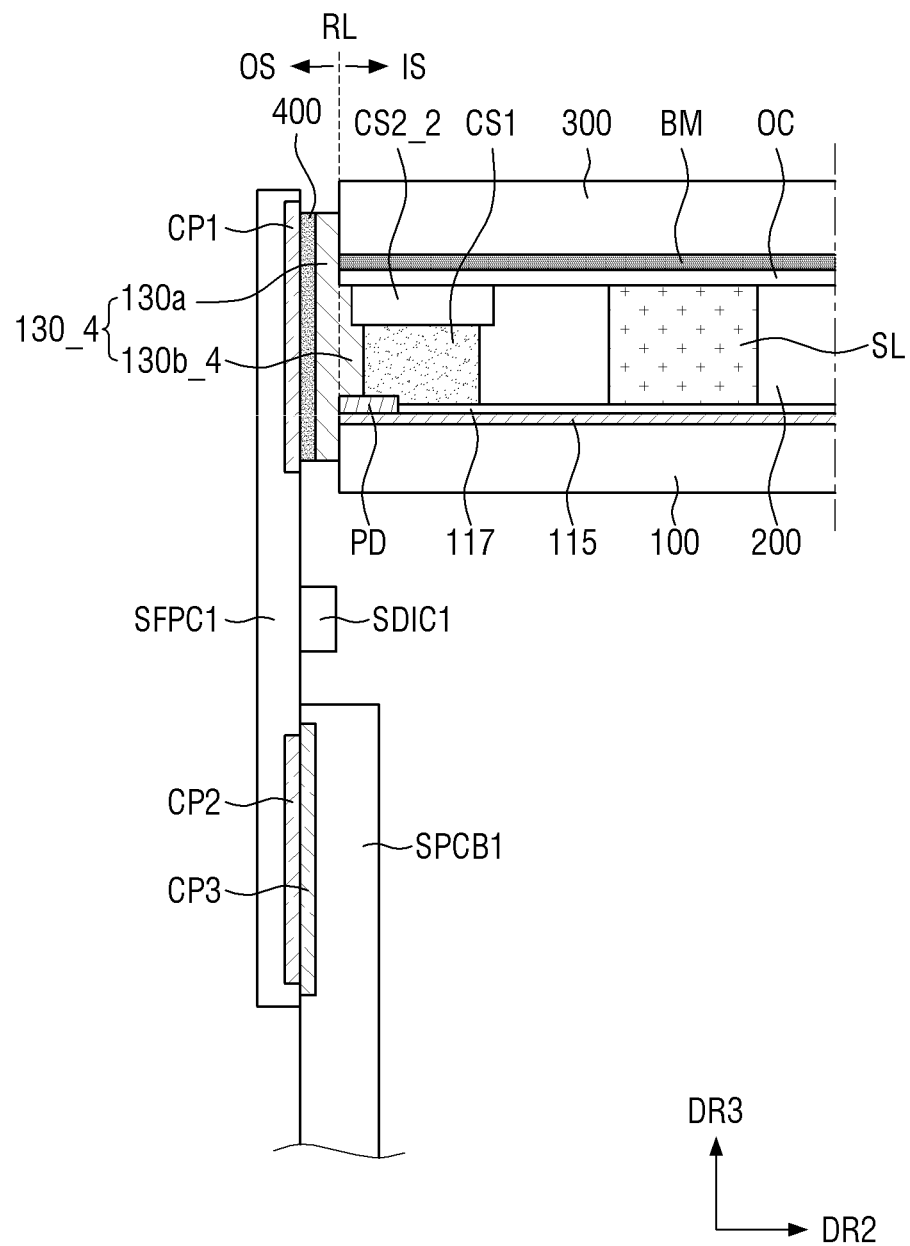
FIG. 17 is a cross-sectional view, taken along line A-A' of FIG. 2, of a display device according to another example embodiment of the present invention.
Figure 18:
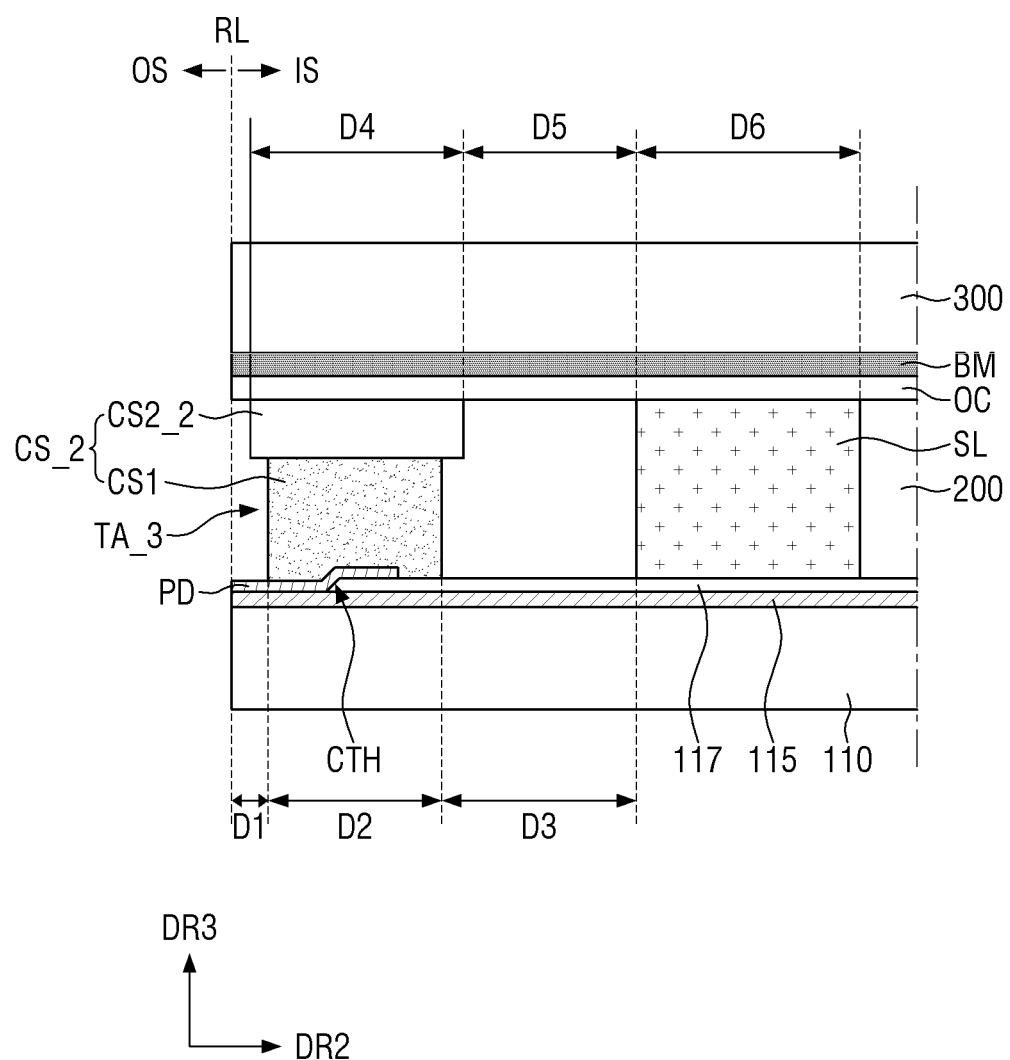
FIG. 18 is a cross-sectional view for explaining each connection pad of the display device of FIG. 17.

FIG. 17 is a cross-sectional view, taken along line A-A' of FIG. 2, of a display device according to another example embodiment of the present invention; FIG. 18 is a cross-sectional view for explaining each connection pad of the display device of FIG. 17; and FIG. 19 is a perspective view illustrating how elements disposed on a first substrate are arranged with respect to elements disposed on a second substrate in the display device of FIG. 17.

Figure 19:
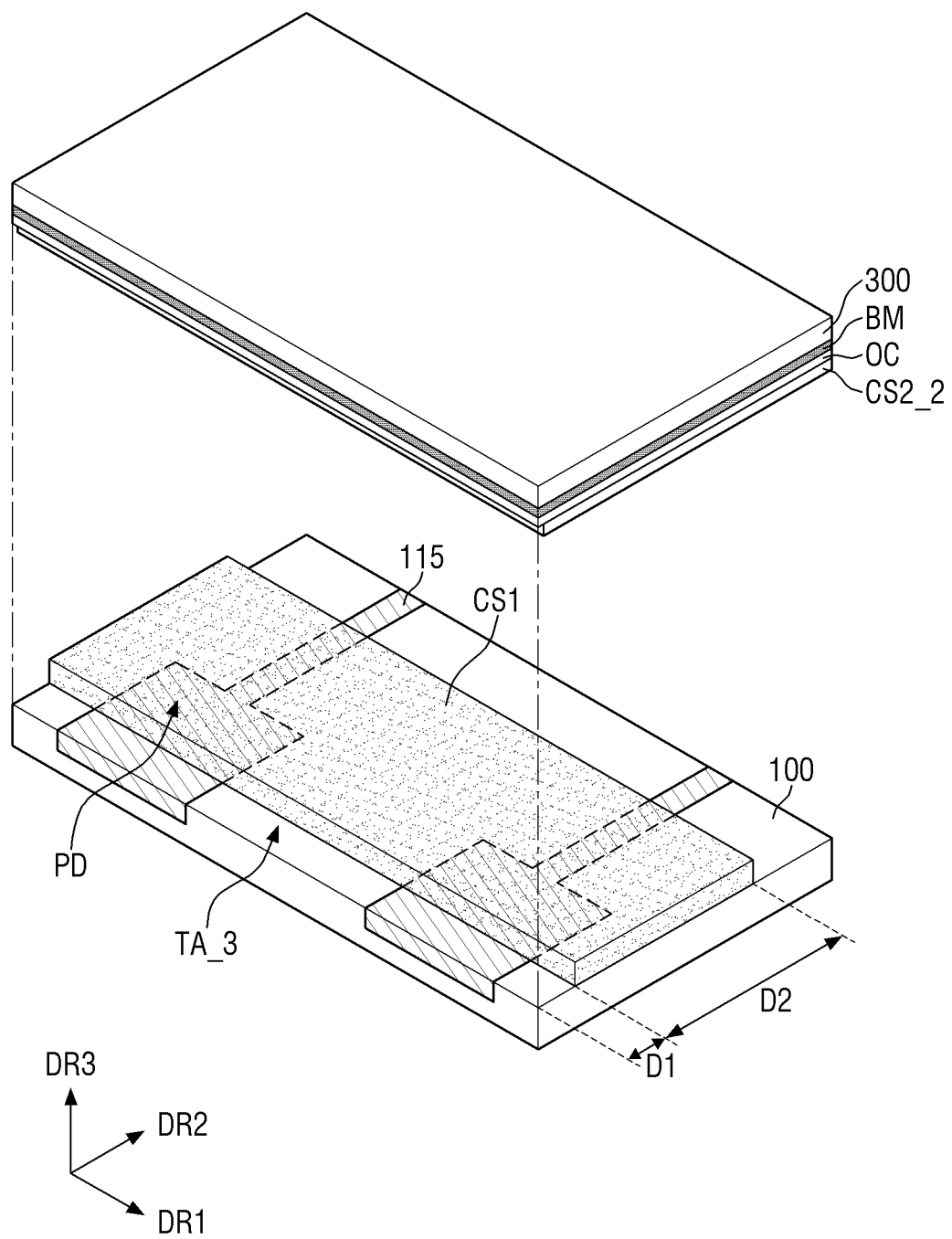
FIG. 19 is a perspective view illustrating how elements disposed on a first substrate are arranged with respect to elements disposed on a second substrate in the display device of FIG. 17.

The example embodiment of FIGS. 17 through 19 differs from the example embodiment of FIGS. 14 through 16 in that first and second spacers CS1 and CS2_2 are retreated into an inner side IS of a reference line RL and are not aligned with each other in a third direction DR3. The example embodiment of FIGS. 17 through 19 will hereinafter be described, focusing mainly on this and other differences with the example embodiment of FIGS. 14 through 16.

Referring to FIGS. 17 through 19, a display device 1 may include a first substrate 100 and a second substrate 300, which faces the first substrate 100, on one side thereof.

The first spacer CS1 may be disposed on an inner side IS of a reference line RL, which is defined as a line extending from one side surface of the first substrate 100 in a third direction DR3. Specifically, side surfaces of the first substrate 100, a connection wire 115, a connection pad PD, the second substrate 300, a black matrix BM, and an overcoat layer OC may be aligned with the reference line RL in the third direction DR3, and the first and second spacers CS1 and CS2_2 may be moved away from the reference line RL in a second direction DR2. The distance by which the second spacer CS2_2 is moved away from the reference line RL in the second direction DR2 may be less than the distance by which the first spacer CS1 is moved away from the reference line RL in the second direction DR2.

A recess part TA_3 may be formed in a direction from one side surface to the center of the display device 1 to the center of the display device 1, e.g., in the second direction DR2.

Due to the presence of the recess part TA_3, the top surface of the connection pad PD, a side surface of the first spacer CS1, the bottom surface and a side surface of the second spacer CS2_2, and the bottom surface of the overcoat layer OC may be exposed. Specifically, part of the top surface of the connection pad PD may be exposed by the recess part TA_3, and the rest of the top surface of the connection pad PD may be covered by the first spacer CS1 and may overlap with the first spacer CS1 in the third direction DR3. The first and second spacers CS1 and CS2_2 may be moved away from the reference line RL in the second direction DR2, and the distance by which the second spacer CS2_2 is moved away from the reference line RL in the second direction DR2 may be less than the distance by which the first spacer CS1 is moved away from the reference line RL in the second direction DR2. Thus, each of the overcoat layer OC and the first and second spacers CS1 and CS2_2 may have a height difference. Accordingly, the storage capacity of a connecting pad 130_4 can be further increased.

The connecting pad 130_4 may be disposed to fill the recess part TA_3. For example, the connecting pad 130_4 may include a first portion 130a which is disposed on an outer side OS of the reference line RL and a second portion 130b_4 which is disposed on the inner side IS of the reference line RL and is located in the recess part TA_3.

The second portion 130b_4 of the connecting pad 130_4 may be in contact with the top surface of the connection pad PD, the side surface of the first spacer CS1, the bottom surface and the side surface of the second spacer CS2_2, and the bottom surface of the overcoat layer OC and may be disposed along the surface profile of the recess part TA_3.

In a case where the recess part TA_3, which exposes part of the top surface of the connection pad PD, is formed by moving the first and second spacers CS1 and CS2_2 away from the reference line RL in the second direction DR2, the connecting pad 130_4 can be in contact with the side surface and the top surface of the connection pad PD, and as a result, a contact defect that may occur between the connecting pad 130_4 and the connection pad PD can be effectively prevented.

Also, since the first and second spacers CS1 and CS2_2 are not aligned with each other in the third direction DR3, each of the overcoat layer OC and the first and second spacers CS1 and CS2_2 can have a height difference. Accordingly, the storage capacity of the connecting pad 130_4 can be increased, and as a result, the connecting pad 130_4 can be stably arranged.

According to the aforementioned and other embodiments of the present invention, the bezel size thereof can be effectively reduced, and contact defects between flexible circuit boards and connection pads can be prevented.

Although certain embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a first substrate;
a second substrate facing the first substrate;
a connection pad disposed on the first substrate;
a first spacer disposed on the connection pad and exposing part of the connection pad;
a connecting pad disposed on side surfaces of the first and second substrates, the connecting pad contacting the connection pad;
a connection wire disposed between the first substrate and the connection pad; and
an insulating layer disposed between the connection wire and the connection pad,
wherein:
the connection pad comprises a first surface facing the first substrate, a second surface opposite to the first surface, a first side surface between the first surface and the second surface, and a second side surface opposite to the first side surface;
the first side surface of the connection pad is disposed below the first spacer and overlaps the first spacer;

the second side surface of the connection pad directly contacts the connecting pad;
a second spacer is disposed directly on the first spacer;
both of the first spacer and the second spacer directly contact the connecting pad;
the insulating layer includes a contact hole which exposes the connection wire; and
the connection pad contacts the connection wire through the contact hole.

2. The display device of claim 1, wherein:
the side surfaces of the first and second substrates are aligned with each other in the first direction which is perpendicular to the top surface of the first substrate and a top surface of the second substrate; and
the first spacer is spaced apart from the side surfaces of the first and second substrates by a first distance in a direction toward inner sides of the first and second substrates.

3. The display device of claim 2, wherein:
a first portion of a top surface of the connection pad contacts the first spacer; and
a second portion of the top surface of the connection pad contacts the connecting pad.

4. The display device of claim 3, wherein the second side surface of the connection pad is aligned with the side surfaces of the first and second substrates in the first direction.

5. The display device of claim 2, wherein the first distance is 1 μm to 153 μm.

6. The display device of claim 2, wherein the first distance is less than a width of the first spacer.

7. The display device of claim 2, wherein the first spacer includes a blue colorant.

8. The display device of claim 2,
wherein a side surface of the second spacer is aligned with the side surfaces of the first and second substrates in the first direction.

9. The display device of claim 2, further comprising:
a black matrix disposed between the second spacer and the second substrate; and
an overcoat layer disposed between the black matrix and the second spacer,
wherein side surfaces of the black matrix and the overcoat layer are aligned with the side surfaces of the first and second substrates in the first direction.

10. The display device of claim 2, wherein:
the connection pad includes a body part and a tail part which protrudes from the body part;
the body part contacts the first spacer; and
the tail part contacts the connecting pad.

11. The display device of claim 10, wherein a width of the tail part is the same as the first distance.

12. The display device of claim 1, wherein:
the side surface of the second substrate and a side surface of the first spacer are aligned with each other in a first direction which is perpendicular to a top surface of the first substrate and a top surface of the second substrate; and
the side surface of the first substrate and the second side surface of the connection pad are aligned with each other in the first direction and the side surface of the first substrate and the second side surface of the connection pad are spaced apart from the second substrate and the first spacer by a first distance in a direction toward outer sides of the second substrate and the first spacer.

13. The display device of claim 12, wherein the connecting pad contacts the side surface of the first substrate, the second surface of the connection pad, the side surface of the first spacer, and the side surface of the second substrate.

14. A display device comprising:
a first substrate;
a second substrate facing the first substrate;
a first spacer disposed along edge areas of the first and second substrates;
a recess part disposed between a side surface of the first substrate and a side surface of the second substrate;
a connection pad disposed on the first substrate and exposed by the recess part; and
a connecting pad contacting the connection pad inside the recess part,
wherein:
the side surface of the first substrate and the side surface of the second substrate are aligned with each other in a first direction which is perpendicular to a top surface of the first substrate and a top surface of the second substrate;
the first spacer is spaced apart from the first substrate and the second substrate by a first distance in a direction toward inner sides of the first and second substrates;
the connection pad comprises a first surface facing the first substrate, a second surface opposite to the first surface, a first side surface between the first surface and the second surface, and a second side surface opposite to the first side surface;
the first side surface of the connection pad is disposed below the first spacer and overlaps the first spacer;
the second side surface of the connection pad directly contacts the connecting pad;
a second spacer is disposed directly on the first spacer;
both of the first spacer and the second spacer directly contact the connecting pad;
the display device further comprises:
a connection wire disposed between the first substrate and the connection pad; and
an insulating layer disposed between the connection wire and the connection pad;
the insulating layer includes a contact hole which exposes the connection wire; and
the connection pad contacts the connection wire through the contact hole.

15. The display device of claim 14, wherein a width of the recess part is the same as the first distance.

16. The display device of claim 15, wherein the connecting pad includes a first portion which contacts the second side surface of the connection pad, the side surface of the first substrate and the side surface of the second substrate, and a second portion which is disposed in the recess part and contacts each of the second surface of the connection pad and a side surface of the first spacer.

17. The display device of claim 16, wherein:
the first spacer is disposed between the second spacer and the first substrate;
the second spacer is disposed between the first spacer and the second substrate; and
the second spacer includes a blue colorant.

* * * * *